US012286876B2

(12) United States Patent
Liébana Yeste et al.

(10) Patent No.: US 12,286,876 B2
(45) Date of Patent: Apr. 29, 2025

(54) DRAIN APPARATUS FOR A SUBSEA PIPELINE

(71) Applicant: Trevelyan Trading Ltd, Surrey (GB)

(72) Inventors: Laura Liébana Yeste, Surrey (GB); Lee Trevelyan Thomas, Surrey (GB)

(73) Assignee: Trevelyan Trading Ltd, Surrey (GB)

( * ) Notice: Subject to any disclaimer, the term of this patent is extended or adjusted under 35 U.S.C. 154(b) by 0 days.

(21) Appl. No.: 18/451,401

(22) Filed: Aug. 17, 2023

(65) Prior Publication Data

US 2023/0392490 A1 Dec. 7, 2023

Related U.S. Application Data

(63) Continuation of application No. 16/326,500, filed as application No. PCT/GB2017/052463 on Aug. 21, 2017, now Pat. No. 11,767,747.

(30) Foreign Application Priority Data

Aug. 19, 2016 (GB) .................................. 1614196
Apr. 28, 2017 (GB) .................................. 1706795

(51) Int. Cl.
*E21B 43/36* (2006.01)
*B01D 45/08* (2006.01)
(Continued)

(52) U.S. Cl.
CPC .............. *E21B 43/36* (2013.01); *B01D 45/08* (2013.01); *C10L 3/107* (2013.01); *F17D 3/145* (2013.01); *C10L 2230/08* (2013.01)

(58) Field of Classification Search
CPC ......... E21B 43/36; B01D 45/08; B01D 17/00; B01D 19/00; B01D 19/0042; C10L 3/107; C10L 2230/08; F17D 3/145
See application file for complete search history.

(56) References Cited

U.S. PATENT DOCUMENTS 5,232,475 A 8/1993 Jepson
5,507,858 A 4/1996 Jepson
(Continued)

FOREIGN PATENT DOCUMENTS

GB 2369787 A 6/2002
GB 2526604 A 12/2015
(Continued)

OTHER PUBLICATIONS

Office Action dated Feb. 23, 2021 in European Patent Application No. 17757856.4.
(Continued)

*Primary Examiner* — Christopher P Jones
*Assistant Examiner* — Phillip Y Shao
(74) *Attorney, Agent, or Firm* — Dickinson Wright PLLC

(57) ABSTRACT

The present invention provides a drain apparatus (200) for use in a subsea pipeline to remove liquid from a multiphase flow in the subsea pipeline. The drain apparatus comprises a first channel (20) for carrying a multiphase flow comprising liquid and gas phases; and liquid extraction means (11, 12, 14, 18) for extracting the liquid phase from the multiphase flow in the first channel (20). The internal diameter of the first channel (20) is substantially the same as an internal diameter of a subsea pipe arranged to carry the multiphase flow in the subsea pipeline, such that a pig travelling along the subsea pipe can pass through the first channel (20). The present invention also provides a subsea pipeline comprising a subsea pipe for transporting a multiphase flow subsea; and at least one drain. The at least one drain is disposed partway along a gradient in the subsea pipe to reduce liquid holdup.

20 Claims, 24 Drawing Sheets

(51) Int. Cl.
 *C10L 3/10* (2006.01)
 *F17D 3/14* (2006.01)

(56) References Cited

U.S. PATENT DOCUMENTS

| | | | |
|---|---|---|---|
| 5,525,133 | A | 6/1996 | Haukeness |
| 6,620,221 | B1 | 9/2003 | Lenzing et al. |
| 7,516,794 | B2 | 4/2009 | Gramme et al. |
| 8,453,747 | B2 | 6/2013 | Holm |
| 8,480,788 | B2 | 7/2013 | Balk |
| 2005/0006086 | A1 | 1/2005 | Gramme |
| 2008/0156716 | A1 | 7/2008 | Gramme et al. |
| 2008/0178915 | A1 | 7/2008 | Gramme et al. |
| 2014/0157658 | A1 | 6/2014 | Kaasa et al. |
| 2015/0291901 | A1 | 10/2015 | Maråk et al. |

FOREIGN PATENT DOCUMENTS

| | | | | |
|---|---|---|---|---|
| GB | 2526604 B | * | 10/2020 | ............... C10L 3/10 |
| WO | WO2002/001044 | | 1/2002 | |
| WO | WO2005/115583 | | 12/2005 | |
| WO | WO2011/073203 | | 6/2011 | |
| WO | WO2014/096330 | | 6/2014 | |
| WO | WO2015/036041 | | 3/2015 | |
| WO | WO2015/118072 A2 | | 8/2015 | |
| WO | WO2016/071471 A2 | | 5/2016 | |
| WO | WO2018/033758 | | 2/2018 | |

OTHER PUBLICATIONS

Restriction Requirement dated Oct. 26, 2021 in U.S. Appl. No. 16/326,500.
Non-Final Office Action dated May 11, 2022 in U.S. Appl. No. 16/326,500.
Final Office Action dated Oct. 26, 2022 in U.S. Appl. No. 16/326,500.
Office Action dated Nov. 8, 2022 in Brazilian Patent Application No. BR112019003277-0.
International Search Report and Written Opinion dated Feb. 1, 2018 in PCT Patent Application No. PCT/GB2017/052463.
Notice of Allowance dated May 19, 2023 in U.S. Appl. No. 16/326,500.
Office Action dated Feb. 9, 2024 in Australia Patent Application No. 2022252794.
Examination Report and Search Report dated Jul. 16, 2024 in ARIPO Patent Application No. AP/P/2023/014685.
Substantive Examination Adverse Report dated Mar. 13, 2025 in Malaysia Patent Application No. PI2022002727.
Substantive Examination Adverse Report dated Mar. 13, 2025 in Malaysia Patent Application No. PI2022002779.

* cited by examiner

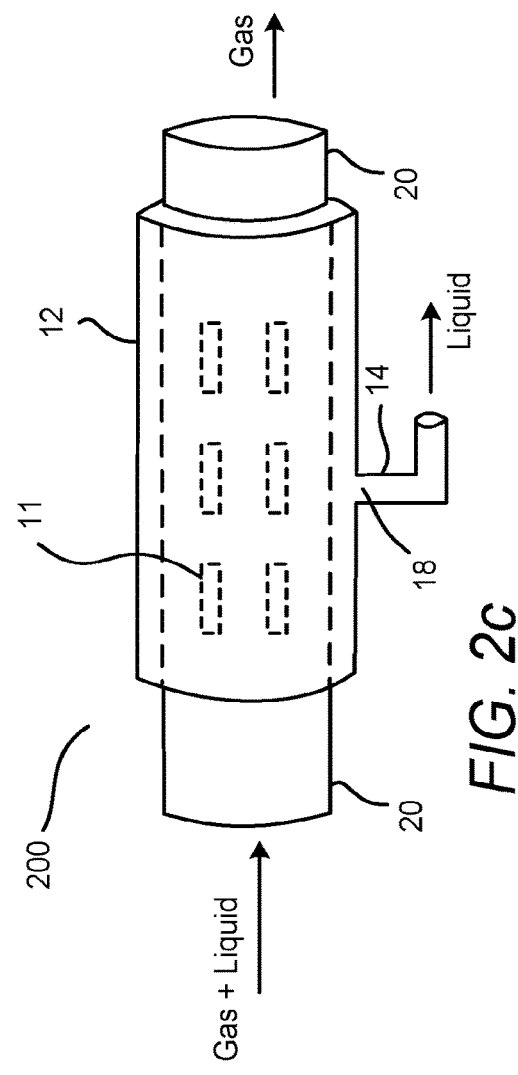
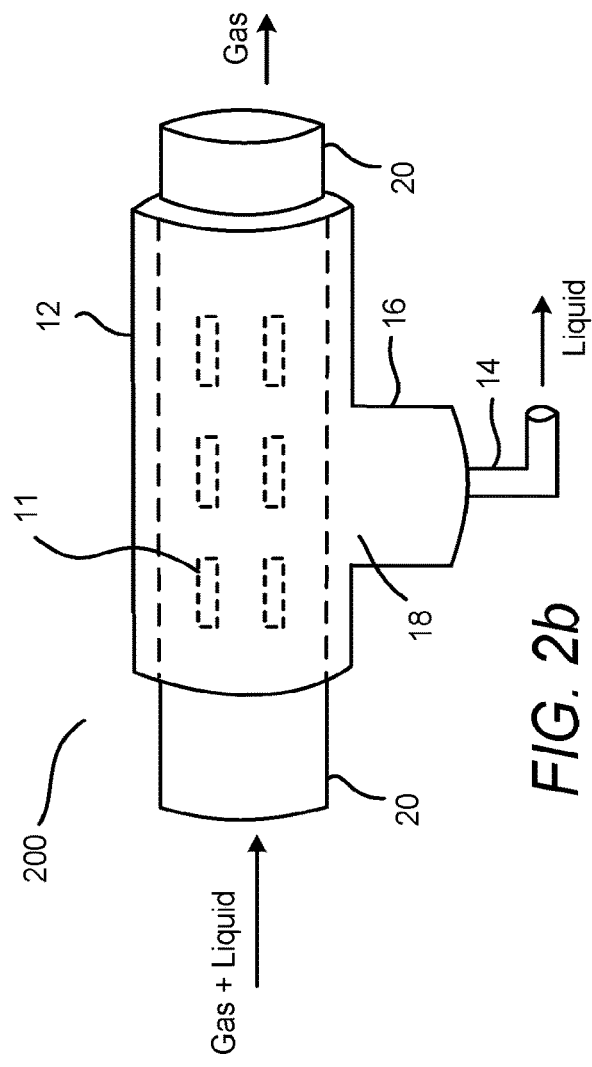
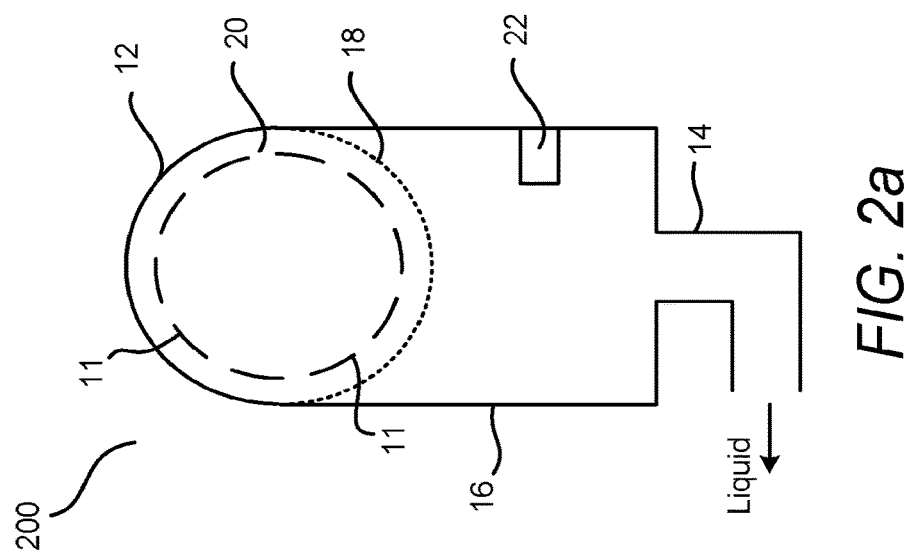

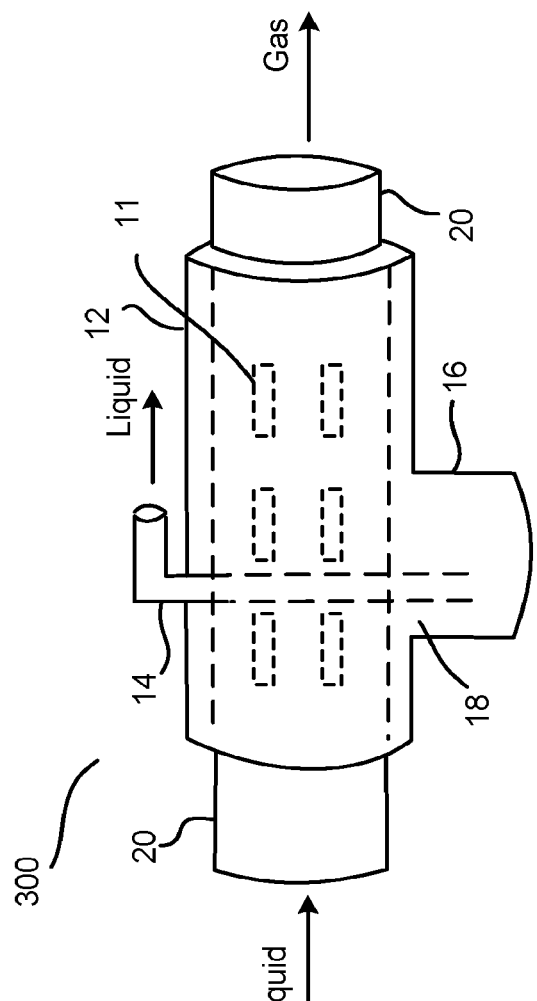
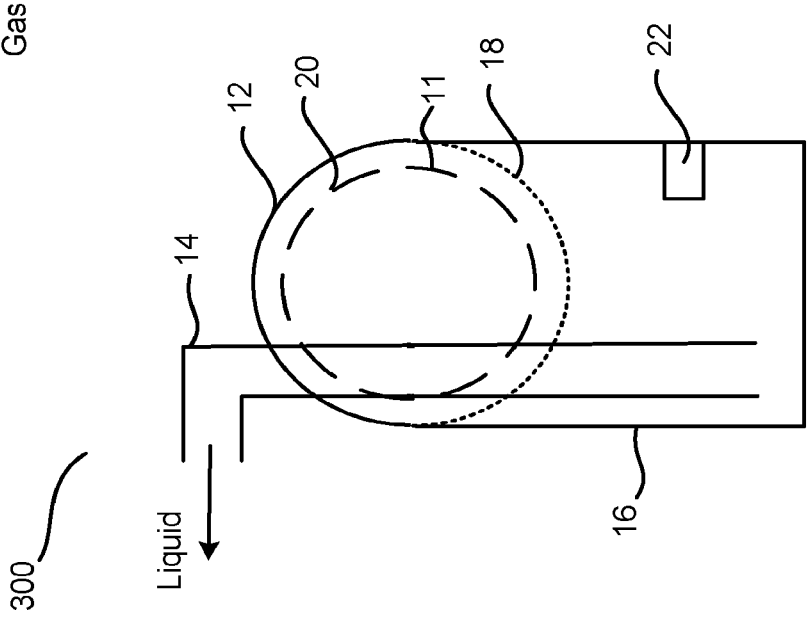
FIG. 3b
FIG. 3a

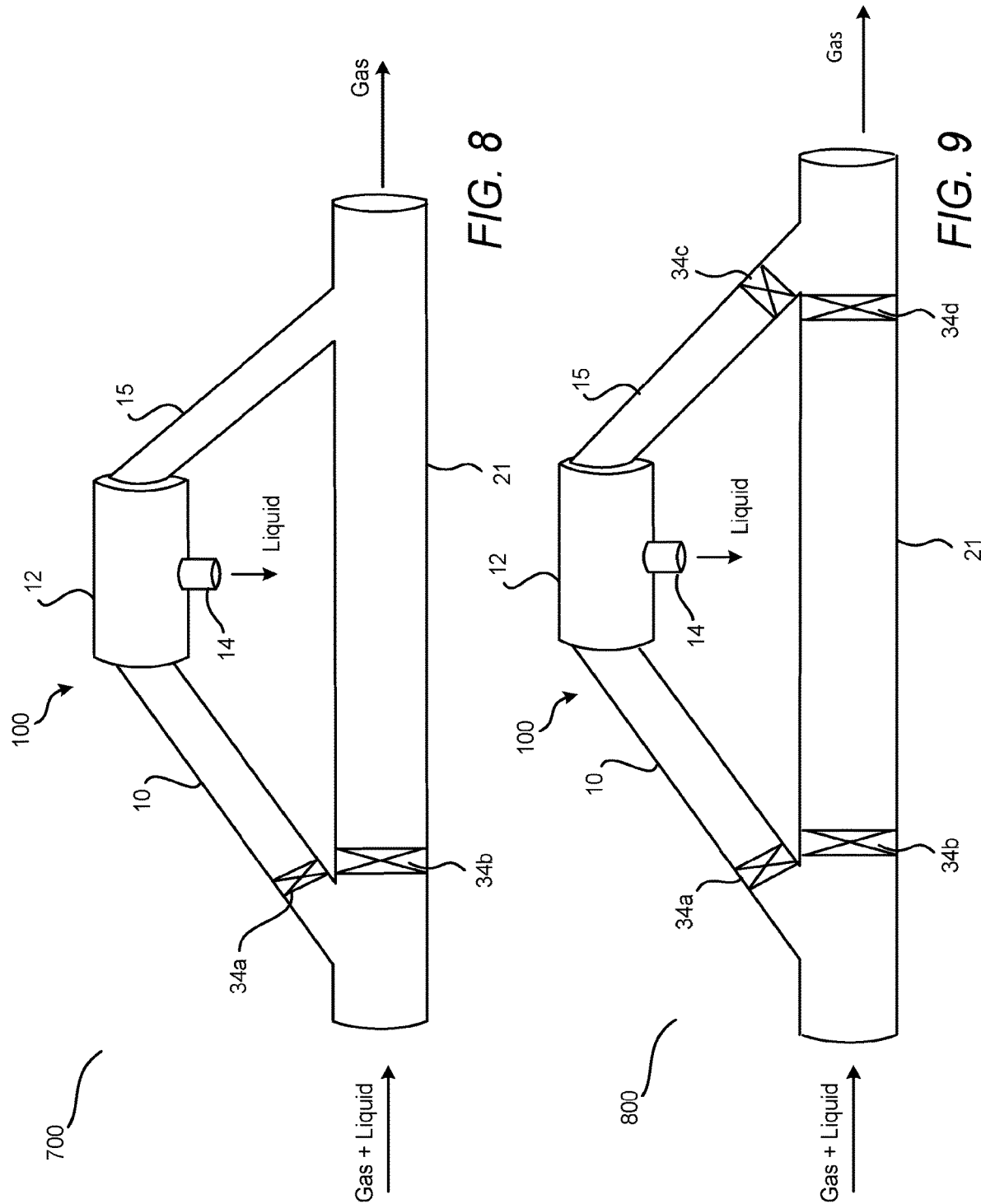

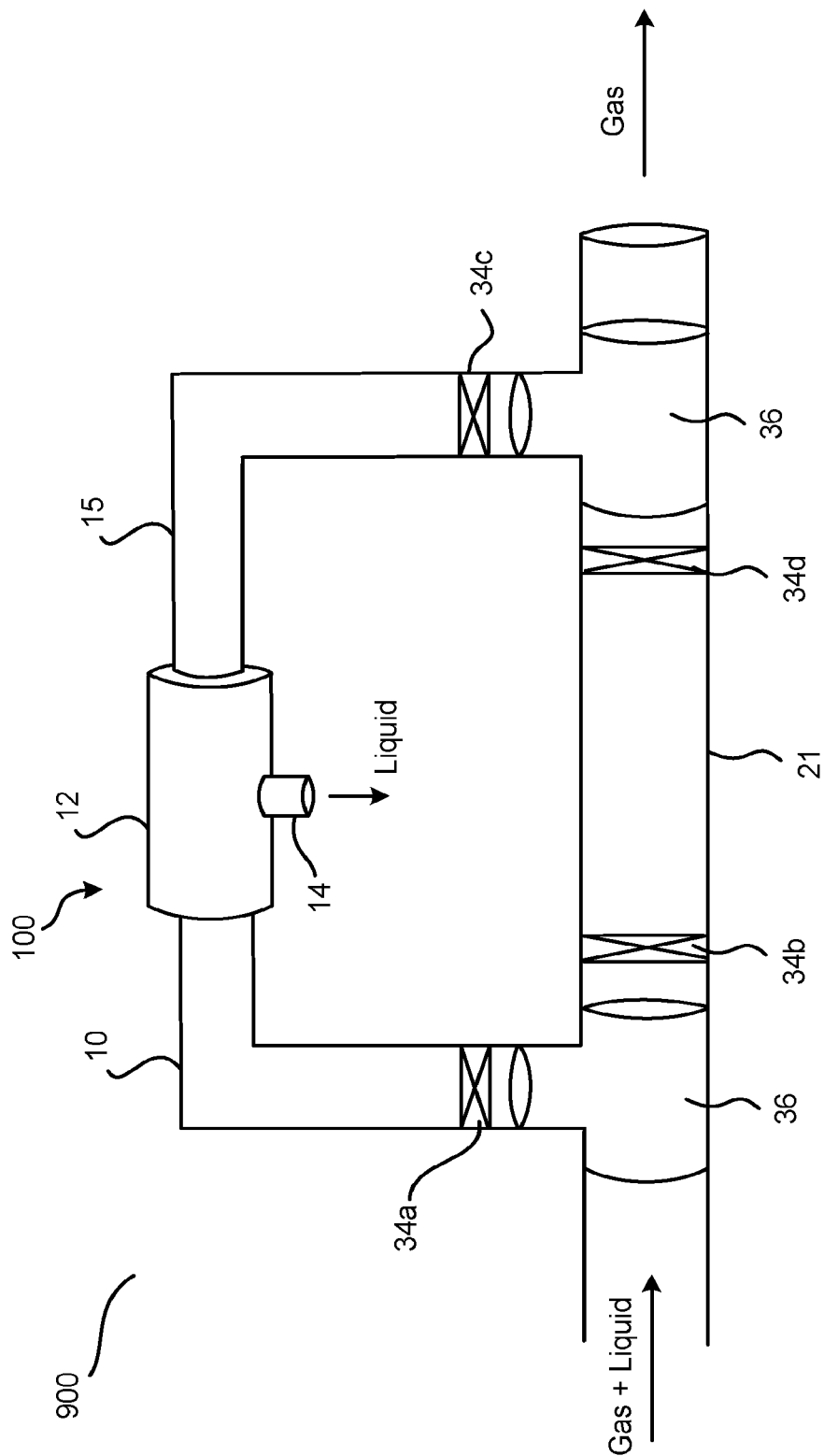

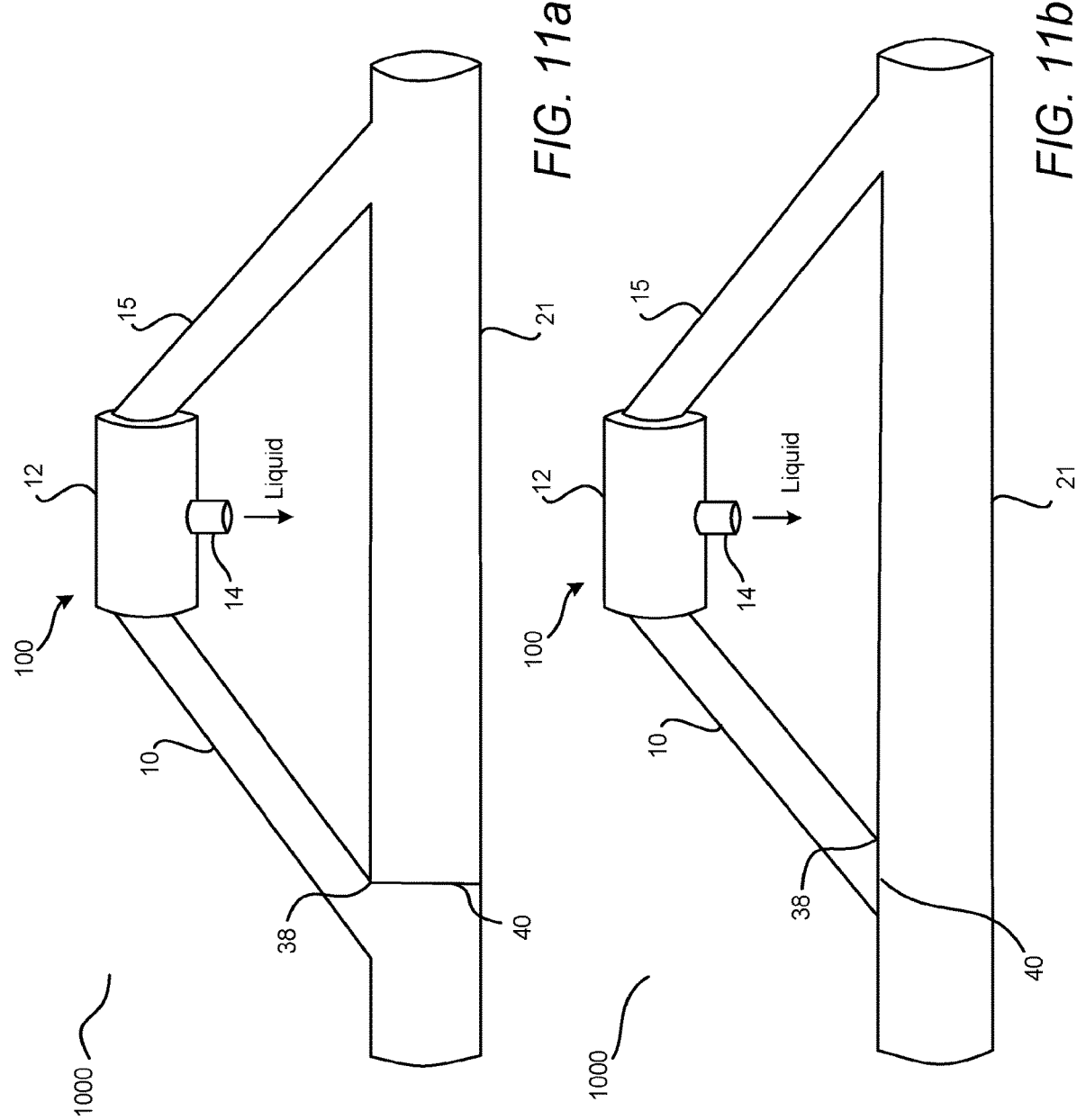

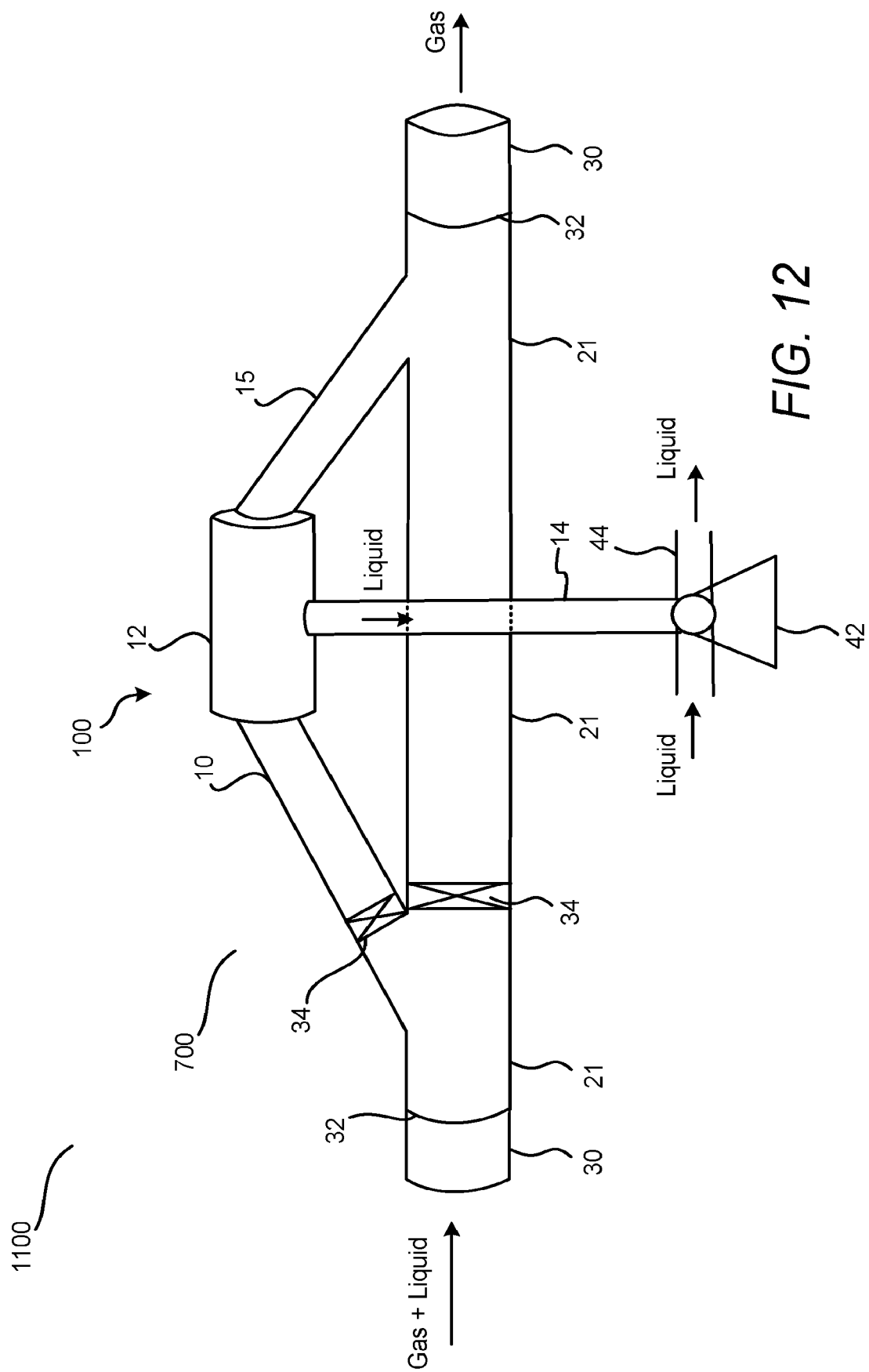

DRAIN APPARATUS FOR A SUBSEA PIPELINE

CROSS REFERENCE TO RELATED APPLICATIONS

The present application is a continuation application of U.S. application Ser. No. 16/326,500, which is a U.S. national phase application under 35 U.S.C. § 371 of International Application No. PCT/GB2017/052463, filed on Aug. 21, 2017 and published as WO 2018/033758 A1 on Feb. 22, 2018, which claims priority to GB Application No. 1614196.2, filed on Aug. 19, 2016, and GB Application No. 1706795.0, filed on Apr. 28, 2017. The content of each of these related applications is incorporated herein by reference in its entirety.

FIELD

The present invention relates to a drain apparatus and a subsea pipeline. More particularly, the present invention relates to a drain apparatus for use in the subsea pipeline.

BACKGROUND

When transporting production gas (which can be later processed into Liquefied Natural Gas (LNG)) along a subsea pipeline, water and other liquid components or mixtures precipitate out of the multiphase flow due to heat and pressure loss. This results in a reduction in pressure driving the system due to the gravitational effect on the condensing water, which means generally production gas cannot naturally flow more than about 80-140 km from a well head. Furthermore, the effect, known as "slugging", increases the back pressure on the well and shortens the production plateau, where it would have been much greater if liquids had not been in the system (in other words, a "dry gas" system).

To solve this problem, both increasing and decreasing the bore of the main carrier pipe within the pipeline have been tried. However, increasing the bore was found to make the slugging worse due to an increase in gravitational pressure losses. Decreasing the bore was found to increase pressure loss due to friction.

Therefore, it is necessary to remove as much liquid from the multiphase flow as possible, as early as possible. To that end, it is known to incorporate a single separator at the well head. However, this still does not produce a pseudo dry gas system. Moreover, it is known to use subsea drains (or, "Low Point Drains" (LPDs)), positioned at the lowest part of a gradient, to remove liquid flowing back down the pipe in the pipeline that precipitated out due to temperature and pressure variations. However, the particular designs of these LPDs, and their location, is shown not to have had a great effect on system efficiency, as indicated by comparing the plots represented by diamonds and squares in FIG. 17. Moreover, present designs of LPDs do not allow continuous pigging operations, with subsequent negative effect on the system's integrity.

Minimising the effect of gravitational pressure losses enables pipelines to have pipes with greater bore diameters, which in turn lowers the pressure drop per unit distance. Reducing the pressure drop also increases the production plateau and allows more resources to be extracted from the ground. Aspects of the present invention aim to address one or more of the aforementioned drawbacks inherent in prior art subsea pipelines, while still allowing continuous pigging operations.

SUMMARY

According to a first aspect of the present invention, there is provided a drain apparatus for use in a subsea pipeline to remove liquid from a multiphase flow in the subsea pipeline, the drain apparatus comprising:
 a first channel for carrying a multiphase flow comprising liquid and gas phases; and
 liquid extraction means for extracting the liquid phase from the multiphase flow in the first channel,
wherein the internal diameter of the first channel is substantially the same as an internal diameter of a subsea pipe arranged to carry the multiphase flow in the subsea pipeline, such that a pig travelling along the subsea pipe can pass through the first channel.

Advantageously, the first aspect provides a means for transporting gas greater distances by removing liquid from a subsea pipe in a subsea pipeline at any chosen point along the length of the subsea pipe. By being able to be positioned anywhere along the subsea pipe, rather than at the well head, more liquid can be removed from the system. The drain apparatus can be positioned anywhere along the subsea pipe by virtue of it being configured to allow pigging operations to continue uninterrupted between a well head and a terminal on the land.

The liquid extraction means may be configured so as not to permit the multiphase flow to bypass the pig as the pig passes through the first channel, such that a pressure differential can be maintained across the pig. In some embodiments, the liquid extraction means comprises at least one opening formed in a wall of the first channel to permit liquid to be extracted through the at least one opening, and a distance between the furthest downstream point of the at least one opening and the furthest upstream point of the at least one opening is less than 1.5 times the internal diameter of the first channel. For example, in some embodiments the distance between the furthest downstream point of the at least one opening and the furthest upstream point of the at least one opening is less than 0.8 times the internal diameter of the first channel.

The drain apparatus may be installed in a subsea pipeline, and the drain apparatus may be disposed partway along a gradient in the subsea pipe to reduce liquid holdup.

The liquid extraction means may be a slug catcher or a separator.

The liquid extraction means may comprise an inlet to receive liquid from the first channel, and a chamber in fluid communication with the inlet.

The liquid extraction means may be offset from the longitudinal axis of the first channel.

The drain apparatus may further comprise at least one valve arranged to block the inlet in a first mode of operation and the first channel in a second mode of operation.

The drain apparatus may further comprise:
 a second channel configured to bypass the first channel, wherein the liquid extraction means is disposed on the second channel.

The inlet may be formed in a wall of the first channel.

The liquid extraction means may comprise an outlet in fluid communication with the chamber for removing liquid from the drain apparatus.

The drain apparatus may further comprise:
first and second inlets formed in a wall of the first channel along the longitudinal axis of the first channel;
a baffle arranged to divide the chamber into first and second chambers, wherein the first inlet is arranged in the first chamber and the second inlet is arranged in the second chamber; and
a conduit disposed outside the chamber and connected to the first and second chambers to fluidly connect the first chamber to the second chamber, wherein the outlet is arranged in fluid communication with the conduit.

The drain apparatus may further comprise:
at least one valve arranged in the conduit for controlling a flow through the conduit.

The liquid extraction means may comprise a reservoir in fluid communication with an opening formed in the bottom of the chamber. The opening may have a diameter substantially equal to the diameter of the chamber. The opening may extend across the full width of the chamber. The reservoir may comprise an overflow outlet formed through a side surface of the reservoir for transporting gas to the chamber.

The outlet may be formed through the bottom of the chamber. The outlet may extend into the chamber and may be formed through an upper surface of the chamber. The outlet may be formed through the bottom of the reservoir. The outlet may extend into the reservoir and may be formed through an upper surface of the chamber.

The outlet may be in fluid communication with a third channel. The third channel may be an internal conduit of a subsea umbilical line or a second subsea pipe.

The drain apparatus may further comprise at least one pump coupled to the outlet and configured to receive liquid from the outlet and pump the liquid to the surface.

The chamber or the reservoir may further comprise a control mechanism configured to activate the at least one pump when a liquid level in the chamber or the reservoir exceeds a threshold.

The liquid extraction means may comprise: a first liquid extraction chamber comprising at least one first inlet to receive liquid from the first channel; a second liquid extraction chamber comprising at least one second inlet to receive liquid from the first channel, wherein the first channel is arranged to pass through the first liquid extraction chamber before the second liquid extraction chamber; a first storage tank arranged to receive liquid from the first liquid extraction chamber; and a second storage tank arranged to receive liquid from the second liquid extraction chamber. Additionally, the drain apparatus may further comprise a first gas conduit connecting the first storage tank to the first channel to permit gas flow between the first storage tank and the first channel, and/or a second gas conduit connecting the second storage tank to the first channel to permit gas flow between the second storage tank and the first channel. In some embodiments the first gas conduit and the second gas conduit are connected to the first channel after the second liquid extraction chamber. In other embodiments the first gas conduit is connected to the first channel before the second liquid extraction chamber, and the second gas conduit is connected to the first channel after the second liquid extraction chamber. Furthermore, in some embodiments the first channel is configured such that when the drain apparatus is installed in the subsea pipeline the first and second liquid extraction chambers are raised above a level of the subsea pipe at either end of the first channel, such that the first and second storage tanks can be located at or above the level of the subsea pipe and below a level at which the first and second liquid extraction chambers are located. The first channel may be welded directly to the subsea pipe.

The drain apparatus may further comprise at least one injection port for injecting a hydrate inhibitor into the first channel. The injection port may extend through an outer surface of the first channel where the first channel protrudes from the dry side of the chamber. The injection port may comprise at least one valve for controlling the rate of flow of hydrate inhibitor into the first channel. The at least one injection port may be arranged to receive hydrate inhibitor from a fourth channel. The fourth channel may be an internal conduit of a subsea umbilical line or a third subsea pipe.

The hydrate inhibitor may be at least one of Ethylene glycol [MEG], Methanol or a low dose hydrate inhibition chemical.

According to a second aspect of the present invention, there is provided a subsea pipeline comprising:
a subsea pipe for transporting a multiphase flow subsea; and
at least one drain, wherein the at least one drain is disposed partway along a gradient in the subsea pipe to reduce liquid holdup.

Advantageously, the second aspect allows gas to be transported greater distances by reducing pressure losses through the gravitational effect of liquid in the multiphase flow, as it has been shown that positioning a drain along a gradient rather than at the bottom of the gradient draws out more liquid from the subsea pipe.

The at least one drain may be disposed at a point along the gradient at which liquid holdup in the subsea pipeline would otherwise cause slugging to occur. That is to say, the position of the at least one drain can be determined according to the liquid holdup in relation to the gradient that causes a slugging regime.

The at least one drain may be disposed about 15% of the way along the length of the gradient when measured from the lowest point of the gradient.

The at least one drain may comprise the drain apparatus according to the first aspect, wherein the ends of the first channel may be fluidly coupled inline with the subsea pipe. The ends of the first channel may be welded to the subsea pipe.

The subsea pipeline may comprise a plurality of drain apparatuses, wherein an inlet of each pump is arranged to receive liquid from a pump of another drain apparatus.

The subsea pipeline may further comprise a subsea umbilical line having at least one internal conduit coupled to an outlet of the drain and configured to receive liquid from the outlet and transport it to the surface or an offshore terminal, and/or at least one internal conduit coupled to an injection port of the drain and configured to deliver hydrate inhibitor from the surface or an offshore terminal to the injection port. The hydrate inhibitor is at least one of Ethylene glycol [MEG], Methanol or a low dose hydrate inhibition chemical.

All features described herein (including any accompanying claims, abstract and drawings), and/or all of the steps of any method or process so disclosed, may be combined with any of the above aspects in any combination, except combinations where at least some of such features and/or steps are mutually exclusive.

BRIEF DESCRIPTION OF THE FIGURES

Embodiments of the present invention will now be described, by way of example only, with reference to the accompanying drawings, in which:

FIGS. 2a, 2b and 2c show a subsea drain apparatus according to an embodiment of the present invention;

FIGS. 3a and 3b show a subsea drain apparatus according to another embodiment of the present invention;

FIG. 8 shows a subsea drain apparatus according to an embodiment of the present invention;

FIG. 9 shows a subsea drain apparatus according to an embodiment of the present invention;

FIG. 10 shows a subsea drain apparatus according to an embodiment of the present invention;

FIGS. 11a and 11b show a subsea drain apparatus according to an embodiment of the present invention;

FIG. 12 shows a subsea pipeline having a subsea drain apparatus according to an embodiment of the present invention;

DETAILED DESCRIPTION

As noted above, a first aspect of the present invention provides a drain apparatus for use in a subsea pipeline. It would be generally understood that drains, pipes and other components designed for the subsea environment need to remain in place for many years while withstanding challenging conditions. For example, equipment for use in a subsea environment should be corrosion-resistant, and be able to withstand high pressures. By way of example, the drain apparatuses described herein can be made of a suitable material for use in subsea environments, such as high density polyethylene (HDPE), carbon steel or corrosion-resistant alloys. Furthermore, as the bottom of the sea is relatively inaccessible, system redundancy is highly desirable.

Figure 20:
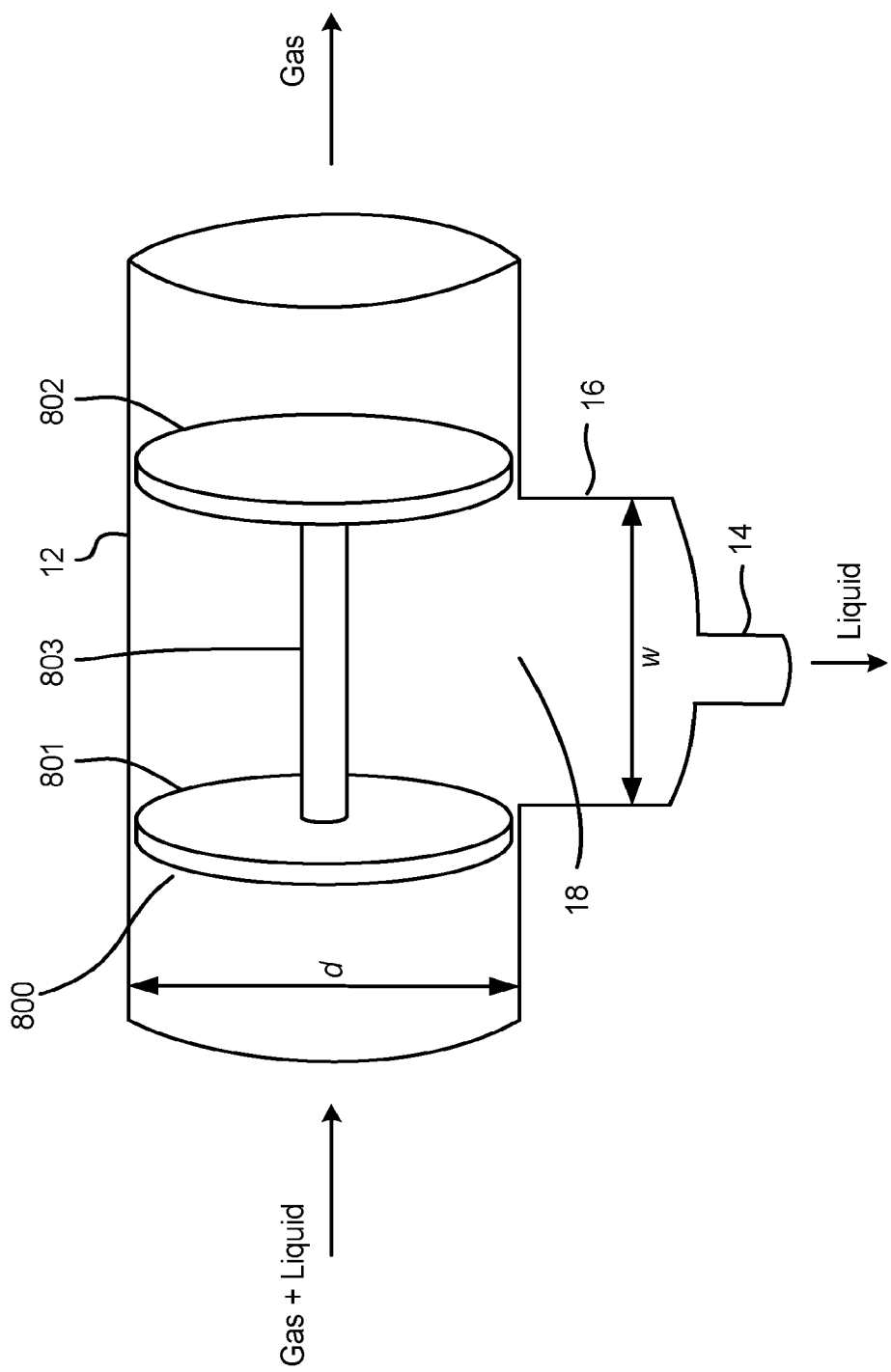
FIG. 20 illustrates a pig passing through a drain apparatus for removing liquid from a multiphase flow in a subsea pipeline, according to an embodiment of the present invention.

Another design consideration when working subsea is the necessity to perform pigging operations without being able to remove a pig to bypass a vessel too small for the pig to pass through. A pig could be, for example, a cleaning pig (operational pigging), or a leak detection pig (inspection pigging). As shown in FIG. 20, a pig 800 comprises at least two driving seals 801, 802, commonly referred to as cups, connected together by a mandrel 803. The length of the mandrel is normally between 0.8 and 1.5 times the internal diameter of the subsea pipeline. The pig 800 can be driven through the subsea pipeline by way of a pressure differential across the pig 800. The pressure differential may be generated by the natural pressure of the wells, for example as is the case during operational pigging, or may be generated by alternative means, such as a pump.

The length of the mandrel 803 that is compatible with a given pipeline system is influenced by two parameters: firstly, the size of any barred tees within the system; and secondly, the minimum radius of any bends within the system. The size of any barred tees determines the minimum length of the mandrel 803, such that it does not get stuck at a barred tee due to fluids/gases being able to flow around the pig 800. The minimum bend radius within a pipeline system determines the maximum length of the mandrel 803, as the pig will need to be able to pass round bends. Pipeline systems are commonly designed to have a minimum bend radius of 3 to 5 times the diameter of the pipeline, in order to accommodate pigging operations. If the mandrel 803 is too long, or if the minimum bend radius is too small, the pig 800 will become physically stuck at the bends with significant impacts to both production flowrates and future inspectability of the pipeline system. It has been known to join a number of pigs together with a tether, for example during inspection pigging, but this brings additional complications and risks of failure during a pigging run.

On land, it is possible to position pig receiving stations and pig launching stations wherever necessary to service the whole gathering pipeline network. A pig launching station may also be referred to as a 'pig launcher', and a pig receiving station may also be referred to as a 'pig catcher'. Subsea, however, pig launchers and receivers are only provided at the well heads, major nodal points on gathering systems, or terminals of subsea pipelines, due to the high cost and complexity associated with inserting and removing pigs in a subsea environment.

Throughout this document, the term "subsea pipe" is used to refer to the pipe that carries the multiphase flow. The subsea pipe may also be referred to as a "carrier pipe", since the function of the subsea pipe is to carry production gas away from the well head. The term "subsea pipeline" is used to refer to a system comprising at least the subsea pipe and a liquid extraction means such as a subsea drain. The terms "gathering system" and "gathering network" are used to refer to a system comprising at least one subsea pipeline (where one subsea pipeline may branch off another subsea pipeline), at least one well head and at least one processing facility.

A subsea drain is designed to remove liquids from a multiphase flow being transported in a pipe of a subsea pipeline. Liquid in the subsea pipeline will reduce pressure and consequently the distance that gas in the multiphase flow can be transported. The multiphase flow, for example, is production gas. The liquid in the multiphase flow is primarily water and hydrocarbons. Contaminants, such as fine sedimentary deposits or liquid chemicals, might also be present in the multiphase flow. The liquid naturally separates from the gas in the multiphase flow due to variations in the pressure caused by frictional means and topography of the ground, and the change in temperatures due to the delta between the gas and the ambient water temperature.

Figure 1:
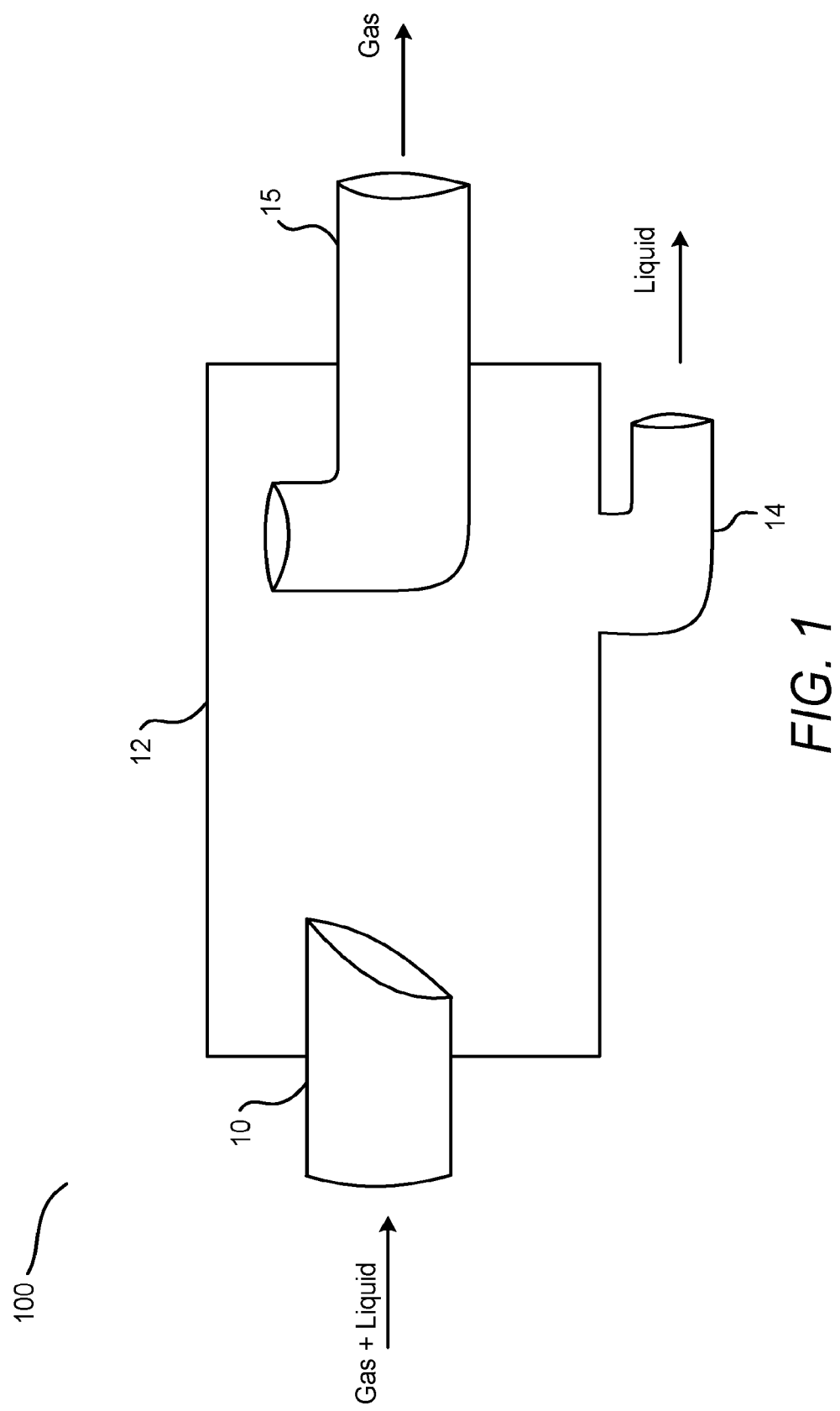
FIG. 1 shows a subsea drain according to one embodiment of the present invention.

One example of a subsea drain 100 according to an embodiment of the present invention is shown in FIG. 1. As shown in FIG. 1, the body of the subsea drain 100 constitutes a chamber 12 for receiving multiphasic flow from an inlet 10. Liquid, which sinks to the bottom of the chamber 12, drains out of a liquid outlet 14 fluidly coupled to the bottom of the chamber 12. The inlet 10 preferably curves downwards as shown in FIG. 1, so that the multiphase flow will be directed towards the bottom of the chamber 12. This arrangement can prevent the multiphase flow from simply bypassing the liquid outlet 14 at high flow rates. Further designs for the liquid outlet 14 are described with reference to FIGS. 3a and 3b that follow. The chamber 12 also has a gas outlet 15 formed on the opposite side to the side having the inlet 10. It would also be apparent to the skilled person that the gas outlet 15 could be formed on a side of the chamber 12 perpendicular to the side having the inlet 10. As the gas rises above the liquid, positioning the gas outlet 15 higher than the lowest point of the chamber 15 reduces the likelihood of liquid continuing to flow with the gas out of the drain 100.

FIG. 1 shows an idealised system, where liquid mixed with gas enters through the inlet 10, and only gas leaves the drain 100 through the gas outlet 15. It would be apparent to the skilled person that the substance leaving the gas outlet 15 is likely to remain a multiphase flow, rather than be pure gas, and so further drains 100 will be necessary to remove liquid that later precipitates out of the multiphase flow. However, for clarity, the side of the drain 100 having the inlet 10 is referred to as the wet side and the side having the gas outlet 15 is referred to as the dry side. Less liquid will leave the dry side than the amount of liquid that entered the wet side. The same reasoning applies to later-described embodiments.

In general the chamber 12 may have any suitable shape. For example, the chamber 12 may be cuboidal, as shown in FIG. 1, or may be cylindrical as shown in later Figures.

As the gas outlet 15 is curved, and the gas outlet 15 is detached from the inlet 10, it would be impossible for a pig to pass through the subsea drain of FIG. 1. It is essential for pigging operations to be performed in most jurisdictions. However, it is not possible to remove a pig and reinsert it into a pipe in a subsea environment without a substantial increase in the number of subsea structures and overall increase in capital expenditure (CAPEX) and operational expenses (OPEX). Therefore, the present invention also provides a means for a pig to bypass the subsea drain 100 shown in FIG. 1 or any other design of liquid drain. Throughout this document, bypass means combined with a drain constitute a drain apparatus. In some embodiments, described with reference to FIGS. 2a to 6 later, these bypass means are arranged on the longitudinal axis of the drain. In other embodiments, described with reference to FIGS. 8 to 11b later, these bypass means are offset from the longitudinal axis of drain (or, in other words, arranged outside of the drain).

In the embodiment shown in FIG. 1, a subsea pipe acts as the separator for separating liquid from the multiphase flow, while the drain 100 simply extracts the liquid.

In operation, the chamber 12 is configured to be free of standing liquids.

FIGS. 2a and 2b show a subsea drain apparatus 200 according to an embodiment of the present invention. The drain apparatus 200 includes a channel 20 for carrying a multiphase flow that passes through the drain apparatus 200. The drain apparatus 200 further comprises a chamber 12 for receiving liquid from the channel 20, and a liquid outlet 14 for receiving liquid from the chamber 12. The drain apparatus 200 is designed to be a standalone structure that can be installed into a pipeline as a single unit.

More specifically, FIG. 2a shows a view through the longitudinal axis of the drain apparatus 200. The channel 20 passes continuously through a cylindrical chamber 12. In other words, the cylindrical chamber 12 has a greater diameter than the diameter of the channel 20. The channel 20 has a diameter approximately equal to the diameter of a subsea pipe for transporting a multiphase flow, to which the drain apparatus 200 will be coupled. The drain apparatus 200 is configured to be installed inline with a subsea pipe with a certain internal diameter, by connecting open ends of the subsea pipe to the open ends of the channel 20. Additionally, the channel 20 has a diameter that is substantially the same as the internal diameter of the subsea pipe, such that a pig can travel through the channel 20 and the subsea pipe. As a result, when the drain apparatus 200 is installed inline with the subsea pipe, a pig travelling along the subsea pipe can pass through the drain apparatus 200 via the channel 20 and continue unhindered (or continuously, or uninterrupted) along the subsea pipe.

The channel 20 has a circular cross section inside the chamber 12 such that the channel forms a tube running through the chamber 12. Alternatively, inside the chamber 12, the channel 20 may have a semi-circular cross section such that the top of the chamber 12 forms a barrier between the channel 20 and the sea. In all embodiments, where the channel 20 extends outside of the chamber 12, the channel 20 is in the form of a tube so that the multiphase flow is not in fluid communication with the sea.

The chamber 12 may have a rectangular cross section instead of the circular cross section shown in FIG. 2a. FIG. 2a further shows a reservoir 16 extending from the bottom of the chamber 12. The reservoir 16 receives liquid from the chamber 12 through an opening 18 in the chamber 12. In an exemplary embodiment, the opening 18 is formed in the bottom of the chamber 12. In other embodiments, the opening 18 is formed in the wall of the chamber at a point lower than the lowest one of a plurality of inlets 11 (or lower than the inlet 11 where there is only one inlet 11), such that standing liquid does not form in the channel 20. The opening 18 has a diameter approximately equal to the diameter of the chamber 12. In this configuration, the walls of the reservoir 16 couple to the chamber 12 at the widest point of the chamber 12. The chamber 12 and the reservoir 16 are integrally formed, i.e. in one piece. Alternatively, the reservoir 16 and the chamber 12 may be fabricated as separate components that are then welded together. Advantageously, the reservoir 16 improves the liquid extraction efficiency of the drain apparatus 200 as more liquid is able to fall out of the chamber 12, and consequently the channel 20, per second.

In the embodiments of the present invention described herein, the drain is configured to remove the liquid phase from the multiphase flow such that the channel 20 is arranged to be free of standing liquid. The reservoir 16 assists in draining the channel so that it is essentially dry during operation, but is not essential unless there is excessive liquid being carried in the multiphase flow. The lack of standing liquid creates a less corrosive environment for the channel 20, which improves the reliability of the system. There are additional benefits, such as when pigging, a liquid slug docs not form in front of the pig to allow smoother operations. Also, by having an excessive amount of liquid in front a pig, production may have to be stopped prematurely due to a reduction in system pressure.

A liquid outlet 14 is formed in fluid communication with the bottom of the reservoir 16. In other words, the liquid outlet 14 communicates with the reservoir 16 through an opening in the bottom of the reservoir 16. The liquid outlet 14 has an internal diameter less than that of reservoir 16. The reservoir 16 shown in FIG. 2a has a flat bottom surface. Alternatively, the bottom surface of the reservoir 16 may taper such that liquid is funnelled into the liquid outlet 14.

Alternatively, the liquid outlet 14 may be formed to pass through a side wall of the reservoir 16, and arranged such that liquid can drain out of the reservoir 16 without inhibiting the multiphase flow in the channel 20.

The reservoir 16 includes a liquid level sensor 22 on its internal surface. The liquid level sensor 22 is for example an optical sensor and light emitter. The light emitter transmits a light beam across the reservoir 16, which is reflected off the opposite wall of the reservoir 16 and received at the optical sensor. The intensity of the reflected light will reduce when a liquid level rises over the level of the liquid level sensor 22. This is just one example of a liquid level sensor 22, and the skilled person would appreciate there are many other alternatives, such as using a float.

The liquid level sensor 22 is electrically coupled to a pump, which is described later. When the liquid level in the reservoir exceeds a threshold level, the pump, in fluid communication with the outlet 14, is activated to remove liquid from the drain apparatus 200 faster.

Alternatively to the design shown in FIG. 2a, the liquid outlet 14 may be coupled directly to the bottom of the chamber 12 such that there is no reservoir 16 between the liquid outlet 14 and the chamber 12. This is shown in FIG. 2c. In embodiments where the liquid outlet 14 is coupled directly to the chamber 12, the liquid level sensor 22 is disposed in the liquid outlet 14.

FIG. 2b shows a perspective view of the subsea drain apparatus 200 of FIG. 2a. Here, it is clear that in the present embodiment some of the channel 20 protrudes from both ends of the chamber 12. In other embodiments, the channel 20 could be the same length as the chamber 12 such that the subsea pipeline can be directly coupled to openings in the end walls of the chamber 12. The chamber 12 is closed at both ends except where the channel 20 protrudes, such that liquid entering the chamber 12 is contained within the chamber 12 until extracted via the liquid outlet 14. The channel may be welded into the ends of the chamber 12 or may be joined to the chamber 12 using a suitable mechanical connection. Alternatively, the chamber 12 and channel 20 may be integrally formed.

Figure 19:
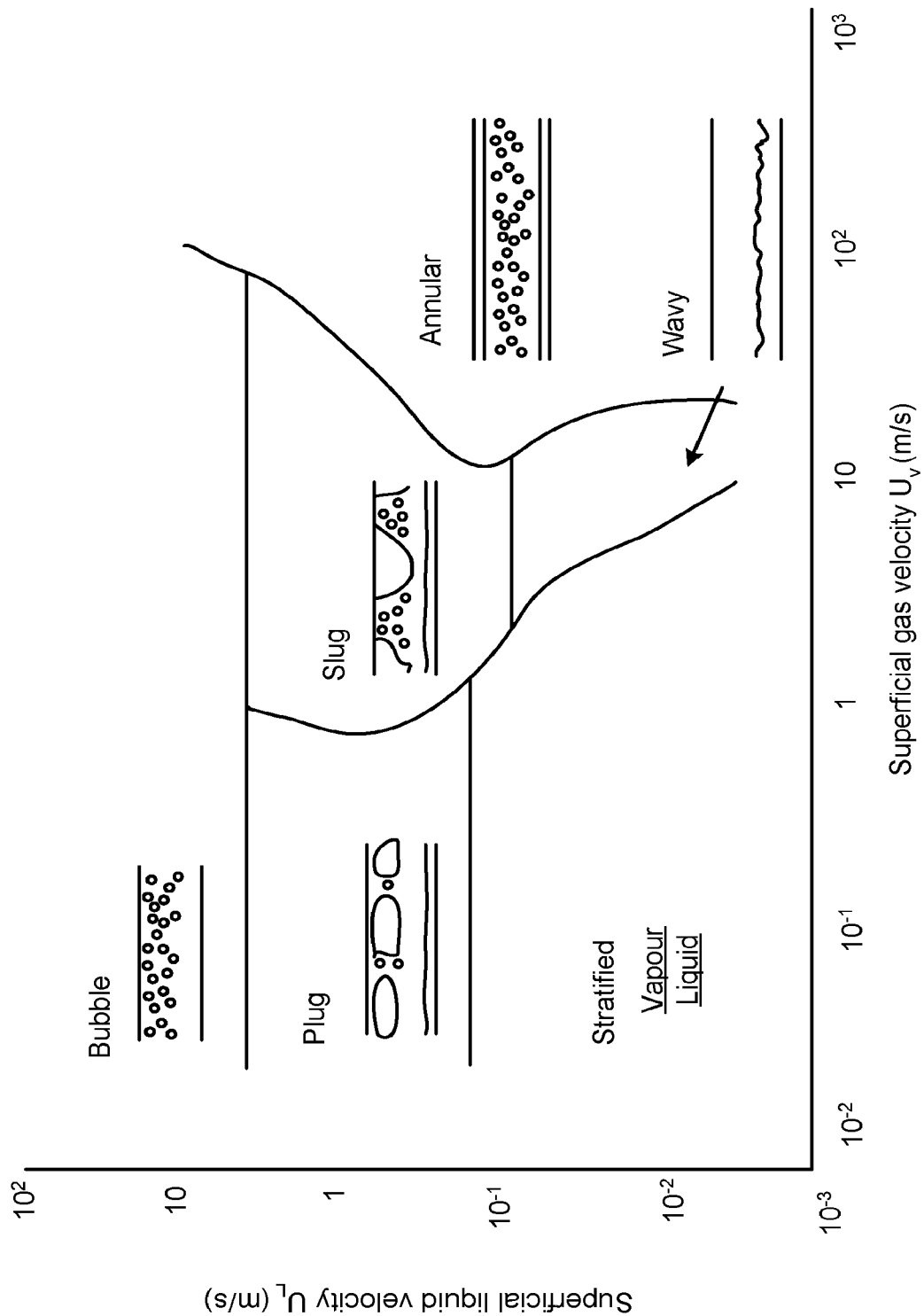
FIG. 19 is a graph showing the flow regimes that occur within a subsea pipe.

The channel 20 includes at least one inlet 11 in fluid communication with the chamber 12. The inlet 11 is sized so that it docs not affect the passage of a pig. In other words, the length of the inlet 11 is less than the length of a pig. Where there is more than one inlet 11, they may be formed along the longitudinal axis of the channel 20, or around the circumference of the channel 20, or both. The inlets 11 are typically formed towards the bottom of the channel 20 so that liquid, heavier than the production gas, can drain out. However, as shown in FIG. 19, various flow regimes can occur within a subsea pipe. FIG. 19 is for a subsea pipe at 0 degree inclination. Slugging may occur, for example, at a superficial liquid velocity of between about 0.1 m/s and 5 m/s and a superficial gas velocity of between 1 m/s and 100 m/s. Under these operating conditions gas and liquid are not evenly distributed throughout the subsea pipe, but travel as large plugs with mostly liquids or mostly gases through the subsea pipe. These large plugs can be referred to as 'slugs'. Annular flow is where liquid forms around the inside wall of a subsea pipe, but the production gas travels down the centre of the pipe. Therefore, it is preferential to install inlets 11 at several different points on the surface of the channel 20.

FIGS. 3a and 3b show a subsea drain apparatus 300 having a similar arrangement to the subsea drain apparatus 200 described with reference to FIGS. 2a and 2b. Description of the same features will not be repeated.

The subsea drain apparatus 300 includes a liquid outlet 14 that extends from the reservoir 16 to, and out of, the upper outer surface of the chamber 12. The liquid outlet 14 may exit the chamber 12 through an upper side portion of the chamber 12, or through the top of the chamber 12.

The bottom of the liquid outlet 14 is spaced apart from the bottom of the reservoir 16 such that liquid can be drawn into the liquid outlet 14. This is clear from FIG. 3a. Alternatively, the bottom of the liquid outlet 14 may contact the bottom of the reservoir 16, but here at least one opening is disposed in a wall of the liquid outlet 14 at a lower portion of the liquid outlet 14 so that liquid can be drawn into the liquid outlet 14 from the reservoir 16.

As shown in FIG. 3a, the liquid outlet 14 passes through both the chamber 12 and the channel 20. FIG. 3a is not drawn to scale, and it would be apparent that the diameter of the liquid outlet 14 is narrow relative to the diameter of the channel 20 and the liquid outlet 14 is offset from the central region of the channel 20, such that it does not inhibit pigging operations through the channel 20.

Alternatively, the liquid outlet 14 is a curved pipe that passes around the outside of the channel 20. In other words, the liquid outlet 14 is curved to follow the contour of the chamber 12 and/or the contour of the outside of the channel 20, and does not pass directly through the channel 20.

It would also be apparent that the design of liquid outlet 14 described with reference to FIGS. 3a and 3b could be implemented in the drain 100 shown in FIG. 1, where the diameter of the liquid outlet 14 need not be relatively small as pigs do not pass through the chamber 12 of the drain 100 anyway.

Having the liquid outlet 14 extend from the top of the chamber 12 reduces the extent to which the structure must be designed to accommodate the seabed with regards to the drain apparatus 300. Penetrating deep into the seabed is a difficult and expensive process.

Similarly to as described with reference to FIG. 2c, the liquid outlet 14 may extend from the chamber 12 instead of a reservoir 16.

Figure 4:
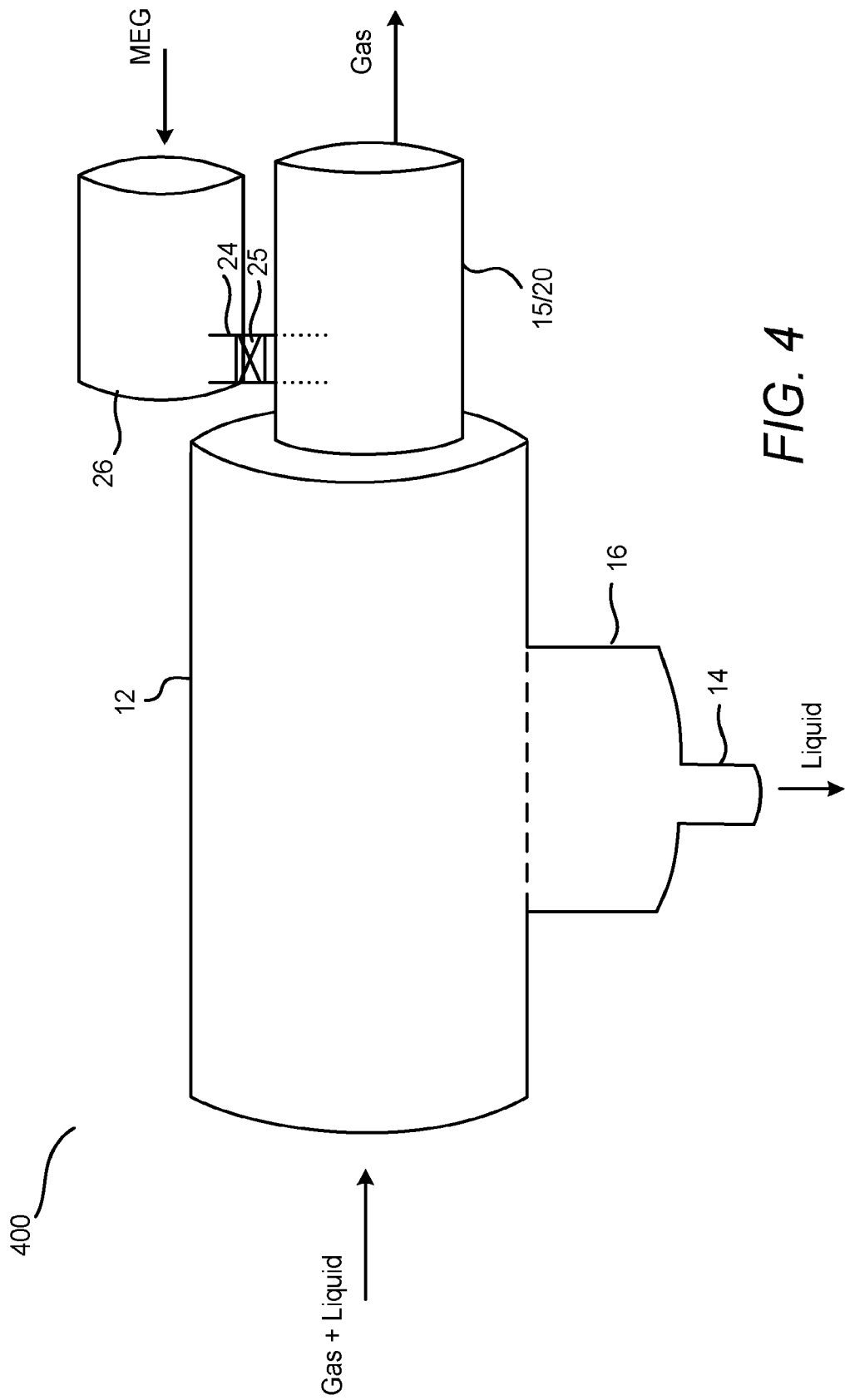
FIG. 4 shows a subsea drain apparatus according to another embodiment of the present invention.

FIG. 4 shows a perspective view of a drain apparatus 400 according to another embodiment of the present invention. The features of FIG. 4 that are common to FIGS. 2a and 2b will not be described repeatedly.

It is known to inject hydrate inhibitor, typically Ethylene glycol (MEG), into a multiphase flow to suppress the formation of hydrates which could otherwise restrict flow along the pipeline and cause operational issues. The hydrate inhibitor is typically injected into the pipeline close to or at the well head. Therefore, as liquid is lost from the pipeline through known subsea drains, the hydrate inhibitor is also lost from the system. Consequently, greater quantities of hydrate inhibitor need to be injected than are actually required. The present invention solves this problem by injecting hydrate inhibitor into the channel 20 transporting the multiphase flow after the liquid that precipitated out of the multiphase flow has escaped through each liquid outlet 14. In other words, hydrate inhibitor is injected into the multiphase flow on the dry side of the drain apparatus 400 through an injection port 24 (or vessel, or duct) in fluid communication with the channel 20. By injecting hydrate inhibitor at regular intervals, the amount of hydrate inhibitor needed is reduced.

The injection port 24 penetrates the channel 20. The injection port 24 may be a flexible conduit, or a rigid pipe. The injection port 24 is made of any suitable subsea material, such as carbon steel. The injection port 24 is welded to the channel 20 at a position corresponding to an opening in the outer surface of the channel 20.

At the other end of the injection port 24, the injection port 24 is coupled to a hydrate inhibitor injection line 26. The hydrate inhibitor injection line 26 is a subsea pipe for transporting hydrate inhibitor to all drain apparatuses 400 disposed along the subsea pipeline.

At least one valve 25 is disposed in the injection port 24. The at least one valve 25 controls the rate of flow of hydrate inhibitor into the multiphase flow. In this way, more hydrate inhibitor can be injected into a drain apparatus 400 close to the well head, where a greater quantity of liquid will remain in the multiphase flow after the drain apparatus 400, than a drain apparatus 400 close to the processing facility on the land.

In some embodiments, instead of being a dedicated subsea pipe, the hydrate inhibitor injection line 26 is at least one internal conduit of a subsea umbilical line 46, as described with reference to FIG. 15.

While FIG. 4 shows a drain apparatus 400 having the features of the drain apparatus 200 shown in FIGS. 2a and 2b, it would be readily apparent that the concept of the hydrate inhibitor injection port 24 can be applied to the drain 100 of FIG. 1, where the hydrate inhibitor is injected into the gas outlet 15, the drain apparatus 200 of FIG. 2c, the drain apparatus 300 of FIGS. 3a and 3b, or any later-described drain apparatuses.

Figure 5:
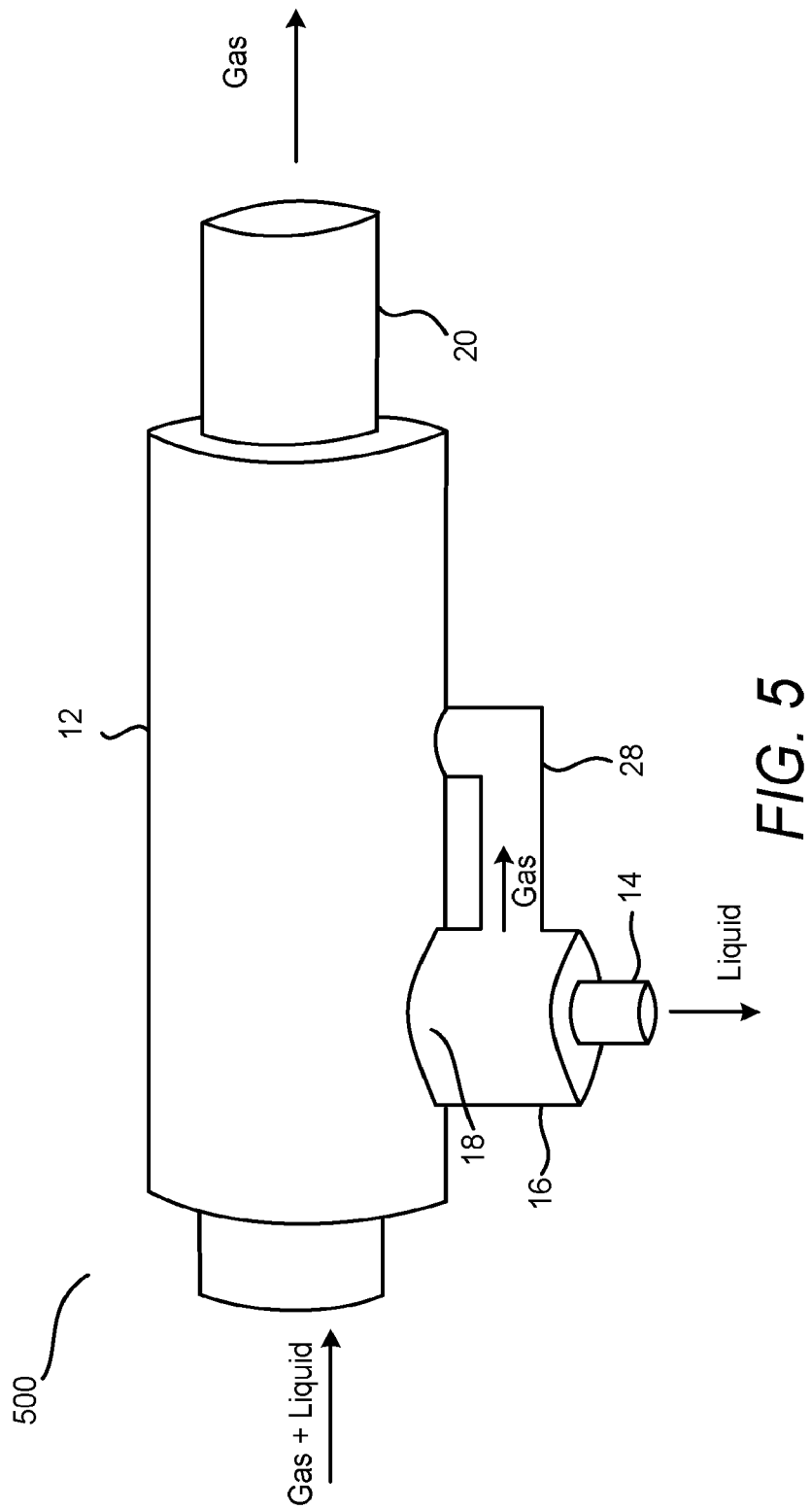
FIG. 5 shows a subsea drain apparatus according to another embodiment of the present invention.

FIG. 5 shows a perspective view of a subsea drain apparatus 500 according to another embodiment of the present invention. The subsea drain apparatus 500 of FIG. 5 is substantially the same as the subsea drain apparatus 200 of FIGS. 2a and 2b, and description of identical features will not be repeated.

Additionally to the subsea drain apparatus 200 described previously, the drain apparatus 500 of FIG. 5 includes an overflow outlet 28 fluidly coupling the reservoir 16 to the dry side of the chamber 12. The overflow outlet 28 penetrates the chamber 12 and the channel 20 such that production gas that inadvertently leaked through the opening 18 in the chamber 12 can be reinjected into the multiphase flow in the channel 20. Alternatively to the embodiment shown in FIG. 5, the overflow outlet 28 may reinject production gas into the channel 20 outside of the chamber 12 on the dry side of the drain apparatus 500.

Further to these advantages, the overflow outlet 28 creates a secondary gas flow and centrifugal forces to pull the liquids into the reservoir 16, thus increasing efficiency.

The overflow outlet 28 is arranged in the side of the reservoir 16, preferably between the liquid level sensor 22 and the opening 18.

As production gas is lighter than liquid, the liquid outlet 14 will be substantially blocked by the liquid, such that the production gas that escaped into the reservoir 16 is more likely to enter the overflow outlet 28 than the liquid outlet 14.

Additionally, any liquid that avoided falling through the opening 18 and entered the dry side of the drain apparatus 500 is captured by the overflow outlet 28, which transports the liquid back to the reservoir 16.

The overflow outlet 28 may also be arranged at an acute angle relative to the horizontal plane, to prevent the likelihood of liquid rising back up to the dry side of the drain apparatus 500 through the overflow outlet 28, and to draw any liquid in the overflow outlet back to the reservoir 16.

The subsea drain apparatus 500 includes a liquid outlet 14 extending from the bottom surface of the reservoir 16. However, the concept of the overflow outlet 28 can also be applied to embodiments having the liquid outlet 14 arranged as described with reference to FIGS. 2c, 3a and 3b, the drain 100 without a reservoir 16 as described with reference to FIG. 1, and the hydrate inhibitor injection port 24 described with reference to FIG. 4.

Figure 6:
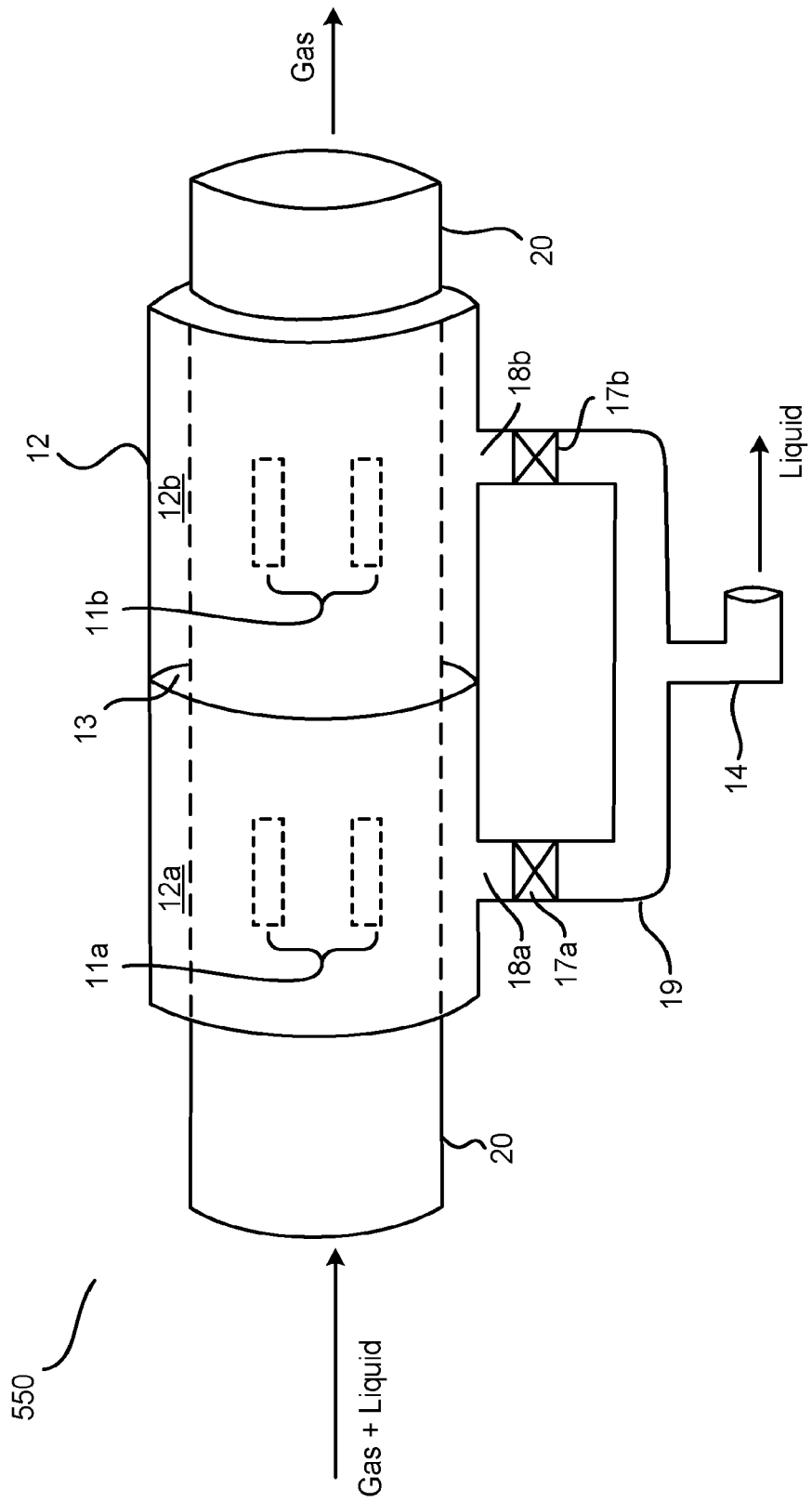
FIG. 6 shows a subsea drain apparatus according to another embodiment of the present invention.

FIG. 6 shows a subsea drain apparatus 550 according to another embodiment. Here, the chamber 12 is divided into a first chamber 12a and a second chamber 12b by a baffle 13. The baffle 13 is an annular structure through which the channel 20 passes.

At least one first inlet 11a is disposed on the dry side of the chamber 12. In other words, the at least one first inlet 11a is disposed in the first chamber 12a. At least one second inlet 11b is disposed on the wet side of the chamber 12. In other words, the at least one second inlet 11b is disposed in the second chamber 12b. The first inlets 11a and second inlets 11b are of a length less than the length of a pig.

The arrangement of the baffle 13 and first and second inlets 11a. 11b induces a pressure differential across the chamber 12.

A first opening 18a is formed in the wall of the first chamber 12a at a point lower than the lowest of the first inlets 11a. Preferably, the first opening 18a is formed in the bottom of the first chamber 12a. A second opening 18b is formed in the wall of the second chamber 12b at a point lower than the lowest of the second inlets 11b. Preferably, the second opening 18b is formed in the bottom of the second chamber 12b.

The first and second openings 18a, 18b are fluidly coupled by a conduit 19. The conduit 19 is disposed outside of the chamber 12. The liquid outlet 14 is fluidly coupled to the conduit 19. In an exemplary embodiment, the liquid outlet 14 is fluidly coupled to the lowest point in the conduit 19. In another embodiment, a portion of the conduit 19 can be enlarged at act as the liquid reservoir 16 according to previously described embodiments. In some embodiments, the portion is the bottom section of the conduit 19.

The pressure differential between the first chamber 12a and the second chamber 12b draws liquid out of the channel 20 and into the conduit 19, such that the conduit 19 provides a secondary gas flow. The liquid then drains through the liquid outlet 14 in the bottom of the conduit 19.

Although not essential to the inventive concept, at least one valve 17a, 17b can be disposed in the conduit. In the present embodiment, a first valve 17a is disposed at the end of the conduit 19 closest to the first opening 18a, and a second valve 17b is disposed at the end of the conduit 19 closest to the second opening 18b. The valves 17a, 17b are closed during pigging operations to improve the efficiency of pig transport.

Figure 7:
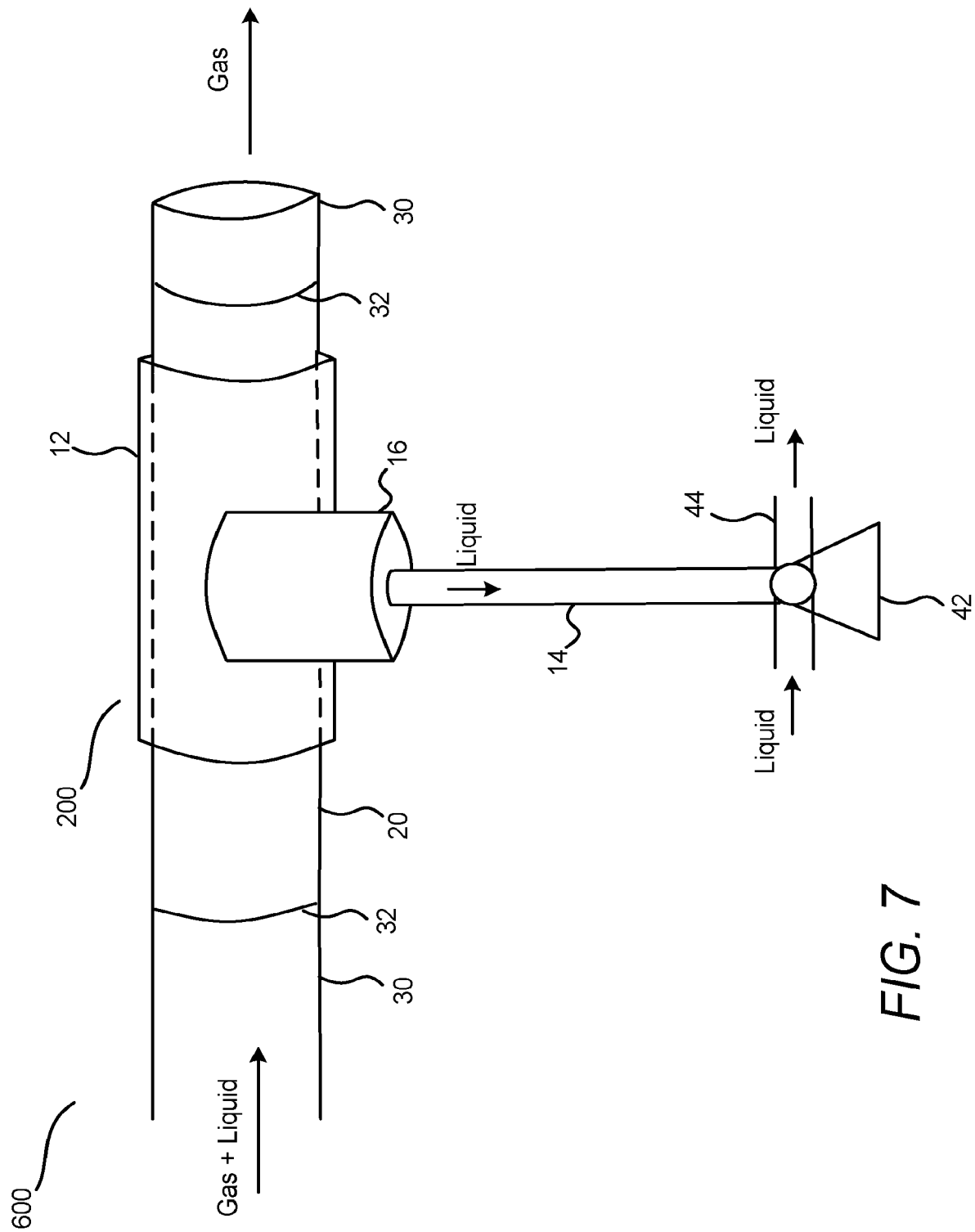
FIG. 7 shows a subsea pipeline having a subsea drain apparatus according to an embodiment of the present invention.

FIG. 7 shows a subsea pipeline 600 according to an embodiment of the present invention. Here, a drain apparatus 200 according to FIGS. 2a and 2b is integrated with a subsea pipe 30. The open longitudinal ends of the channel 20 are coupled to open ends of a subsea pipe 30. The ends of the channel 20 are coupled to the ends of the subsea pipe 30 by welding. In FIG. 7, the channel 20 and subsea pipe 30 are welded at weld points 32. Alternatively, the ends of the subsea pipe 30 and the ends of the channel 20 may include perpendicular flanges, which can be aligned and bolted or riveted with each other, or mechanical connection systems known for subsea systems. A gasket or seal may also be disposed between the ends of the subsea pipe 30 and the channel 20 to further prevent the multiphase flow from escaping the subsea pipeline 600.

As with the embodiment shown in FIGS. 2a and 2b, in the present embodiment the internal diameter of the channel 20 and the internal diameter of the subsea pipe 30 are approximately equal. Therefore, a pig, such as a pipe inspection pig, is able to travel through both the channel 20 and the subsea pipe 30 uninterrupted.

The subsea pipeline 600 includes a pump 42 coupled to the liquid outlet 14. The pump 42 according to this embodiment forms part of the drain apparatus 200 prior to installation of the drain apparatus 200 on the seabed. In other words, the pump 42 becomes integrated with the subsea pipeline 600 upon the ends of the channel 20 being coupled to the subsea pipe 30. Alternatively, the pump 42 can be installed on a retrievable substructure within the drain apparatus 200. Alternatively, the pump 42 may be pre-installed on the seabed, and the liquid outlet 14 is coupled to the pump 42 after the drain apparatus 200 has been laid.

The pump 42 may be continually active to draw liquid from the drain apparatus 200. Alternatively, the pump 42 may be activated by the liquid level sensor 22 detecting that level of liquid in reservoir 16 (or liquid outlet 14) exceeds a threshold.

At one inlet of the pump 42, the pump 42 is coupled to the liquid outlet 14 of the drain apparatus 200. At another inlet of the pump 42, the pump 42 is coupled to a liquid removal line 44 coupled at its other end to another pump. The pumps 42 work in unison to effectively draw liquid from plural drain apparatuses. In other words, each drain apparatus 200 acts as a pumping station for moving liquid to the next drain apparatus in the system. Using a plurality of pumps 42 disposed along the pipeline 600 reduces the pumping overhead versus the prior art, where a single or a plurality of pumps are installed at the end of the pipeline. Furthermore, system redundancy is improved, which is particular important in inaccessible subsea environments. An outlet of the pump 42 is coupled to a liquid removal line 44 for transporting the extracted liquid to a processing facility on the land or an offshore terminal.

The liquid removal line 44 shown in FIG. 7 is a separate subsea pipe. However, in other embodiments, the liquid removal line 44 is an internal conduit of a subsea umbilical line 46.

Rather than there being a pump 42 disposed between separate liquid removal lines 44, the pump 42 may be disposed within a single liquid removal line 44.

While FIG. 7 has been described with reference to the subsea drain apparatus 200 of FIGS. 2a and 2b, in other embodiments the subsea pipeline 600 includes any of the subsea drain apparatuses described with reference to FIGS. 2c to 6.

FIG. 8 shows a plan view of a subsea drain apparatus 700 according to another embodiment. In other words, FIG. 8 is shown from the perspective of someone looking down onto the drain apparatus 700 which is sitting, for example, on the seabed. Here, a drain 100 as shown in FIG. 1 is offset from, and coupled to, a bypass channel 21 by the inlet 10 and the gas outlet 15. Alternatively to the drain 100 according to FIG. 1, the drain apparatus may include a separator or slug catcher. A slug catcher is a term of art, and will not be described in detail here. In the embodiment shown in FIG. 8, a subsea pipe 30 with which the drain apparatus 700 is integrated acts as the separator for separating liquid from the multiphase flow, while the drain 100 simply extracts the liquid. The drain apparatus 700 is designed to be a stand-alone structure that can be installed into a pipeline as a single unit or as a separate manifold connected by spools.

As part of a subsea pipeline, the bypass channel 21 is coupled to a subsea pipe 30 in the manner explained with reference to FIG. 7. In other words, the drain 100 is offset from the bypass channel 21 and the subsea pipe 30 in the horizontal plane. The drain 100 may be further offset from the bypass channel 21 and the subsea pipe 30 in the vertical plane. Moreover, the internal diameter of the bypass channel 21 is substantially the same as that as the subsea pipe 30, so that a pig can travel through the bypass channel 21 and the subsea pipeline 30 uninterrupted.

A valve 34a is disposed in the inlet 10 and a valve 34b is disposed in the bypass channel 21 in order to control the direction of travel of multiphase flow or a device travelling through the subsea drain apparatus 700. To prevent disruption to the flow, or damage to the pig or drain apparatus 700, the valves 34a, 34b are disposed as close to the junction between the inlet 10 and bypass channel 21 as possible.

When the valve 34a in the inlet 10 is closed and the valve 34b in the bypass channel 21 is open, a pig is able to travel from a well head, through the bypass channel 21, towards land, without becoming stuck in the drain 100. Conversely, when the valve 34a in the inlet 10 is open and the valve 34b in the bypass channel 21 is closed, the multiphase flow is able to pass through the drain 100 so that liquid in the multiphase flow is drawn out of the multiphase flow.

While FIG. 8 shows the liquid outlet 14 pointing towards the bypass channel 21, in other embodiments, the liquid outlet 14 is arranged to face directly away from the bypass channel 21, or upwards and directly away from the seabed. When the drain 100 is offset from the bypass channel 21 in the vertical plane, the liquid outlet 14 may be arranged to point vertically downwards, as the offset raises the drain 100 from the seabed and prevents subsea excavation work being necessary to bury the liquid removal line 44 that will be connected to the liquid outlet 14 when the drain apparatus 700 is integrated with a subsea pipe 30 to form a subsea pipeline.

In embodiments of the present invention, by configuring the apparatus so as to support the drain 100 at a certain height above the seabed, a liquid storage vessel for collecting and storing liquid extracted via the liquid outlet 14 can also be situated above the seabed, thereby removing the need to excavate the seabed in order to accommodate the liquid storage vessel. For example, a liquid storage vessel may comprise a reservoir 16 or conduit 19 disposed beneath the drain 100, as described above with reference to FIGS. 4, 5 and 6, or may comprise a separate vessel situated a certain distance away from the drain and connected to the liquid outlet 14 formed in the drain 100 via a suitable connection, such as a pipe arranged to carry liquid from the liquid outlet 14 to the storage vessel.

In embodiments in which the drain 100 is raised above the seabed, the drain 100 may consequently be situated above the level of the main pipeline, which typically rests directly on the seabed. A difference in height between the drain 100 and the pipeline can be accommodated in various ways, for example, through natural elastic deflection within the pipeline either side of the drain 100, or by providing a prefabricated piggable bend before and/or after the drain 100, to connect the raised drain 100 to the pipeline at a lower level.

FIG. 9 shows a plan view of a subsea drain apparatus 800 according to another embodiment. The subsea drain apparatus 800 is similar to the subsea drain apparatus 700 described with reference to FIG. 8. In FIG. 9, a valve 34c is disposed in the gas outlet 15. A further valve 34d is disposed in the bypass channel 21. To prevent disruption of the flow or damage to the pig or drain apparatus 800, the valves 34c, 34d are disposed as close to the junction between the gas outlet 15 and the bypass channel 21 as possible.

The additional valves 34c, 34d allow pigging operations to be performed in both directions along the subsea pipeline, i.e. from well head to land (or an off shore facility) and from land (or an offshore facility) to well head. Additionally, the additional valves 34c, 34d provide more control over the drain apparatus 800. Additionally, the additional valves 34c, 34d prevent multiphase flow that passed through the drain 100 from returning back down the bypass channel 21, and prevent a pig that bypassed the drain 100 through the bypass channel 21 from entering the gas outlet 15.

FIG. 10 shows a plan view of a subsea drain apparatus 900 according to another embodiment. The drain apparatus 900 includes a drain 100 and valves 34a-d as described with reference to FIG. 9. Alternatively to a drain 100, the drain apparatus 900 may include a separator or slug catcher.

Further to the subsea drain apparatus 800 of FIG. 9, the drain apparatus 900 of FIG. 10 includes an inline tee junction 36 at the junction between the bypass channel 21 and the inlet 10 and at the junction between the bypass channel 21 and the gas outlet 15.

The inline tee junction 36 is welded into the bypass channel 21 and inlet 10, and into the bypass channel 21 and gas outlet 15.

The use of inline tee junctions 36 improves manufacturing efficiency and improves the reliability of the subsea drain apparatus 900.

FIGS. 11a and 11b show a plan view of a subsea drain apparatus 1000 according to another embodiment. FIG. 11a shows the subsea drain apparatus 1000 operating in a first mode of operation. FIG. 11b shows the subsea drain apparatus 1000 operating in a second mode of operation. The subsea drain apparatus 1000 is similar to the subsea drain apparatus 700 described with reference to FIG. 8.

In FIGS. 11a and 11b, the valves 34a, 34b are replaced by a single valve unit. Here, a hinge 38 on the junction between the inlet 10 and the bypass channel 21 is coupled to a blocking member 40. The hinge 38 is manually operable by way of an electrical signal received from a control room on land (or an offshore facility) or at the well head. The electrical signal is received through an internal conduit of a subsea umbilical line 46 described with reference to FIG. 15. In alternative embodiments, at least one sensor for detecting a pig is disposed along the subsea pipe 30. When a pig is detected, the hinge 38 is automatically operated to change the position of the blocking member 40 to open the bypass channel 21. A predetermined period of time after the pig has passed the sensor, the hinge 38 is operated to close the bypass channel 21 and open the inlet 10. In further embodiments, the hinge 38 is arranged to operate automatically at predetermined times.

The blocking member 40 is of a length chosen to substantially block the bypass channel 21 in the first mode of operation and block the inlet 10 in the second mode of operation. Additionally, the blocking member 40 can be formed from a material that is substantially impermeable to either a liquid or gas phase in the multiphase flow. Therefore, in the first mode of operation, multiphase flow is directed through the drain 100 but not the bypass channel 21. In the second mode of operation a pig is directed through the bypass channel 21 but not the drain 100.

Similarly to as described with reference to FIG. 9, the drain apparatus 1000 may further include a second valve unit arranged to alternately block the gas outlet 15 and the bypass channel 21.

FIG. 12 shows a part of a subsea pipeline 1100 according to an embodiment of the present invention. The subsea pipeline 1100 includes a subsea drain apparatus 700 coupled to open ends of a subsea pipe 30. The open ends of the bypass channel 21 are coupled to the open ends of the subsea pipe 30. Coupling may comprise welding, bolting, or any other well-known means for producing an air-tight seal between vessels coupled subsea. In FIG. 12, the ends of the bypass channel 21 are welded to the ends of the subsea pipe 30 at weld points 32. A gasket or seal may also be disposed between the ends of the subsea pipe 30 and the bypass channel 21 to further prevent the multiphase flow from escaping the subsea pipeline 1100.

The internal diameter of the bypass channel 21 and the internal diameter of the subsea pipe 30 are approximately equal. Therefore, a pig, such as a pipe inspection pig, is able to travel through both the bypass channel 21 and the subsea pipe 30 uninterrupted.

While a drain apparatus 700 according to FIG. 8 is shown in this embodiment, this is for illustrative purposes only, and any drain apparatus as described with reference to FIGS. 9 to 11b may be used instead of the drain apparatus 700 of FIG. 8 in alternative embodiments.

The subsea pipeline 1100 includes a pump 42 coupled to the liquid outlet 14. The pump 42 according to this embodiment forms part of the drain apparatus 700 prior to installation of the drain apparatus 700 on the seabed. In other words, the pump 42 becomes integrated with subsea pipeline 1100 upon the ends of the bypass channel 21 being coupled to the subsea pipe 30. Alternatively, the pump 42 may be pre-installed on the seabed, and the liquid outlet 14 is coupled to the pump 42 after the drain apparatus 700 has been laid.

The pump 42 may be continually active to draw liquid from the drain apparatus 700. Alternatively, the pump 42 may be activated by the liquid level sensor 22 detecting that level of liquid in chamber 12, reservoir 16 or liquid outlet 14 exceeds a threshold.

At one inlet, the pump 42 is coupled to the liquid outlet 14 of the drain apparatus 700. At another inlet, the pump 42 is coupled to a liquid removal line 44 coupled at its other end to another pump. The pumps 42 work in unison to effectively draw liquid from plural drain apparatuses. In other words, each drain apparatus 700 acts as a pumping station for moving liquid to the next drain apparatus 700 in the system. Using a plurality of pumps 42 disposed along the pipeline 1100 reduces the pumping overhead versus the prior art, where a single or a plurality of pumps are installed at the end of the pipeline. Furthermore, system redundancy is improved, which is particular important in inaccessible subsea environments. An outlet of the pump 42 is coupled to a liquid removal line 44 for transporting the extracted liquid to a processing facility on the land (or an offshore facility).

The liquid removal line 44 shown in FIG. 12 is a separate subsea pipe. However, in other embodiments, the liquid removal line 44 is an internal conduit of a subsea umbilical line 46.

Rather than there being a pump 42 disposed between separate liquid removal lines 44, the pump 42 may be disposed within a single liquid removal line 44.

Figure 13:
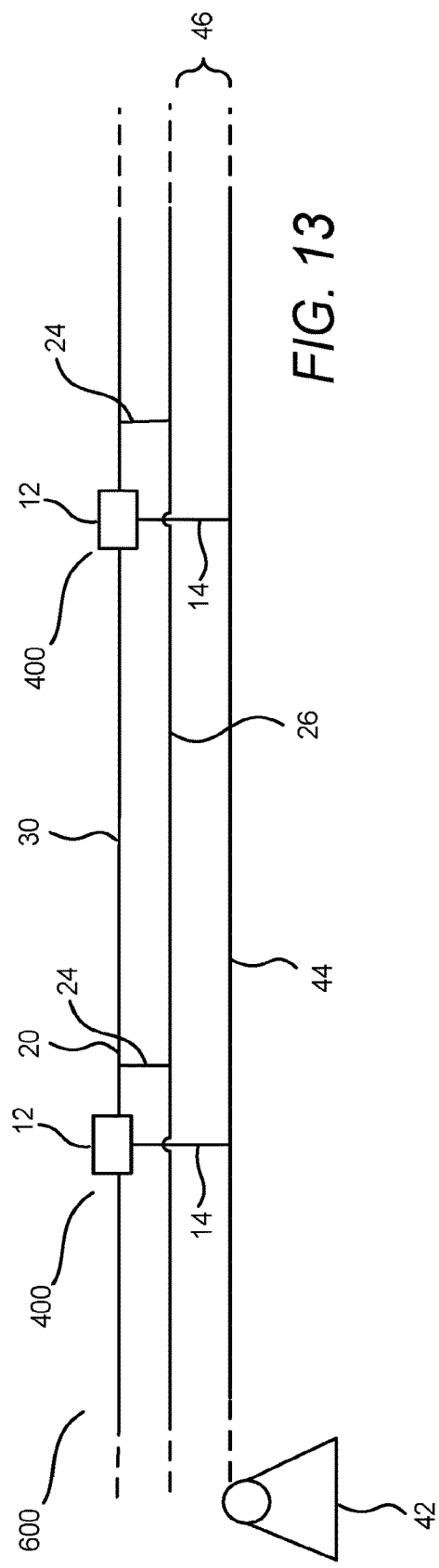
FIG. 13 shows a subsea pipeline having a subsea drain apparatus according to an embodiment of the present invention.

FIG. 13 shows a system view of a more specific embodiment of the subsea pipeline 600 described with reference to FIG. 7. Here, two subsea drain apparatuses 400 having a hydrate inhibitor injection port 24 are shown integrated with a subsea pipe 30.

It would be readily apparent that the number of drain apparatuses 400 is not intended to be limiting and more or fewer subsea drain apparatuses 400 may be integrated with the subsea pipe 30.

The hydrate inhibitor port 24 is coupled to a hydrate inhibitor injection line 26. In the embodiment shown in FIG. 13, the hydrate inhibitor line 26 is an internal conduit of a subsea umbilical line 46. In other embodiments, the hydrate inhibitor line 26 is a separate subsea pipe.

Moreover, the liquid removal line 44, coupled to the pump 42 and to the liquid outlet 14, is also an internal conduit of the subsea umbilical line 46. In other embodiments, the liquid removal line 44 is a separate subsea pipe.

In the embodiment shown in FIG. 13, a single pump 42 is connected to the umbilical line 46 at one end of the subsea pipeline 600. More specifically, the pump 42 is connected to the internal conduit of the subsea umbilical line for carrying extracted liquid to a processing facility on the land. In alternative embodiments, each subsea drain apparatus 400 includes a pump 42 coupled to the subsea umbilical line 46.

Figure 14:
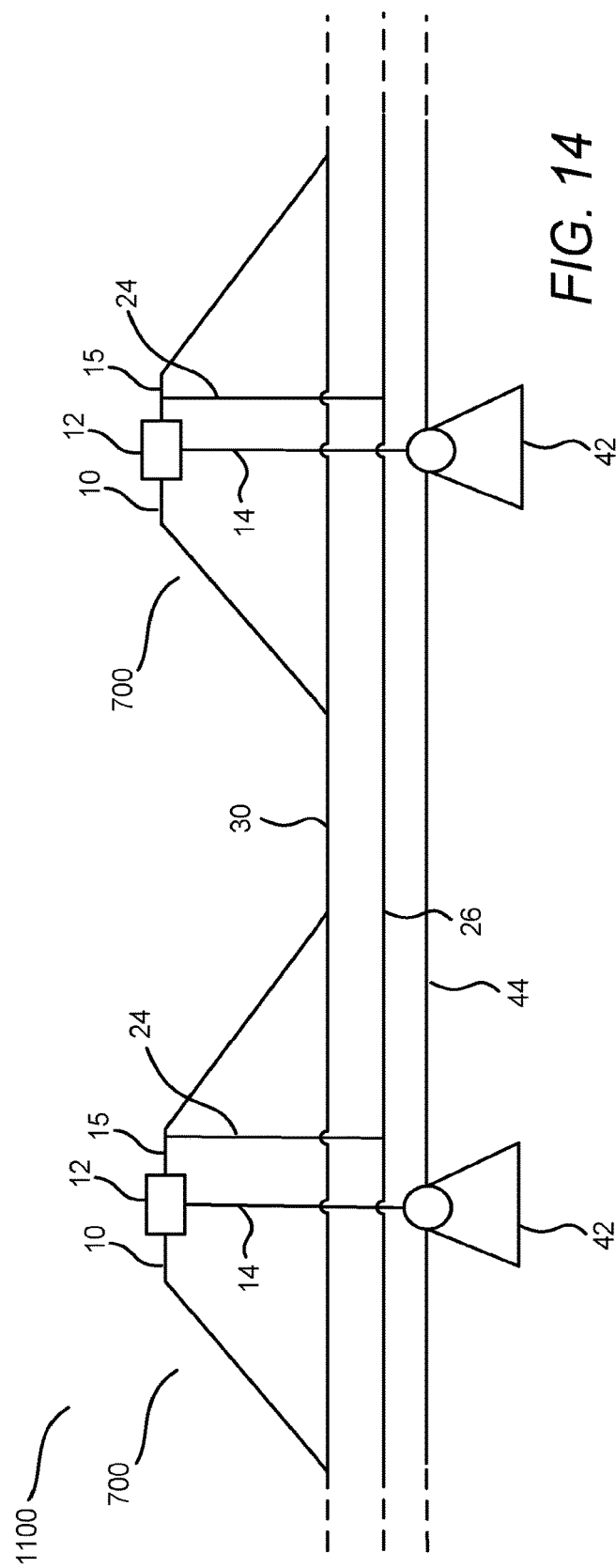
FIG. 14 shows a subsea pipeline having a drain apparatus according to an embodiment of the present invention.

FIG. 14 shows a system view of a more specific embodiment of the subsea pipeline 1100 described with reference to FIG. 12. Here, two subsea drain apparatuses 700 having a hydrate inhibitor injection port 24 (as described with reference to FIG. 4 as being compatible with any subsea drain or drain apparatus) are shown integrated with a subsea pipe 30. It would be readily apparent that the number of drain apparatuses 700 is not intended to be limiting and more or fewer subsea drain apparatuses 700 may be integrated with the subsea pipe 30.

Each subsea drain apparatus 700 has a liquid outlet 14 coupled to an inlet of a pump 42. In other words, there are an equal number of pumps 42 and liquid outlets 14. In alternative embodiments, the liquid outlets 14 all filter into the same liquid removal line 44, and pumps 42 either interspersed randomly along the liquid removal line 44 or at the end of the liquid removal line 44 pump the liquid in the liquid removal line 44 to the surface.

The hydrate inhibitor port 24 is coupled to a hydrate inhibitor injection line 26. In the embodiment shown in FIG. 13, the hydrate inhibitor line 26 is a separate subsea pipe. Moreover, the liquid removal line 44, being coupled to a pump 42 at each subsea drain apparatus 700, is also a separate subsea pipe. In alternative embodiments, the liquid removal line 44 and/or the hydrate inhibitor line 26 are internal conduits of a subsea umbilical line 46.

Figure 15:
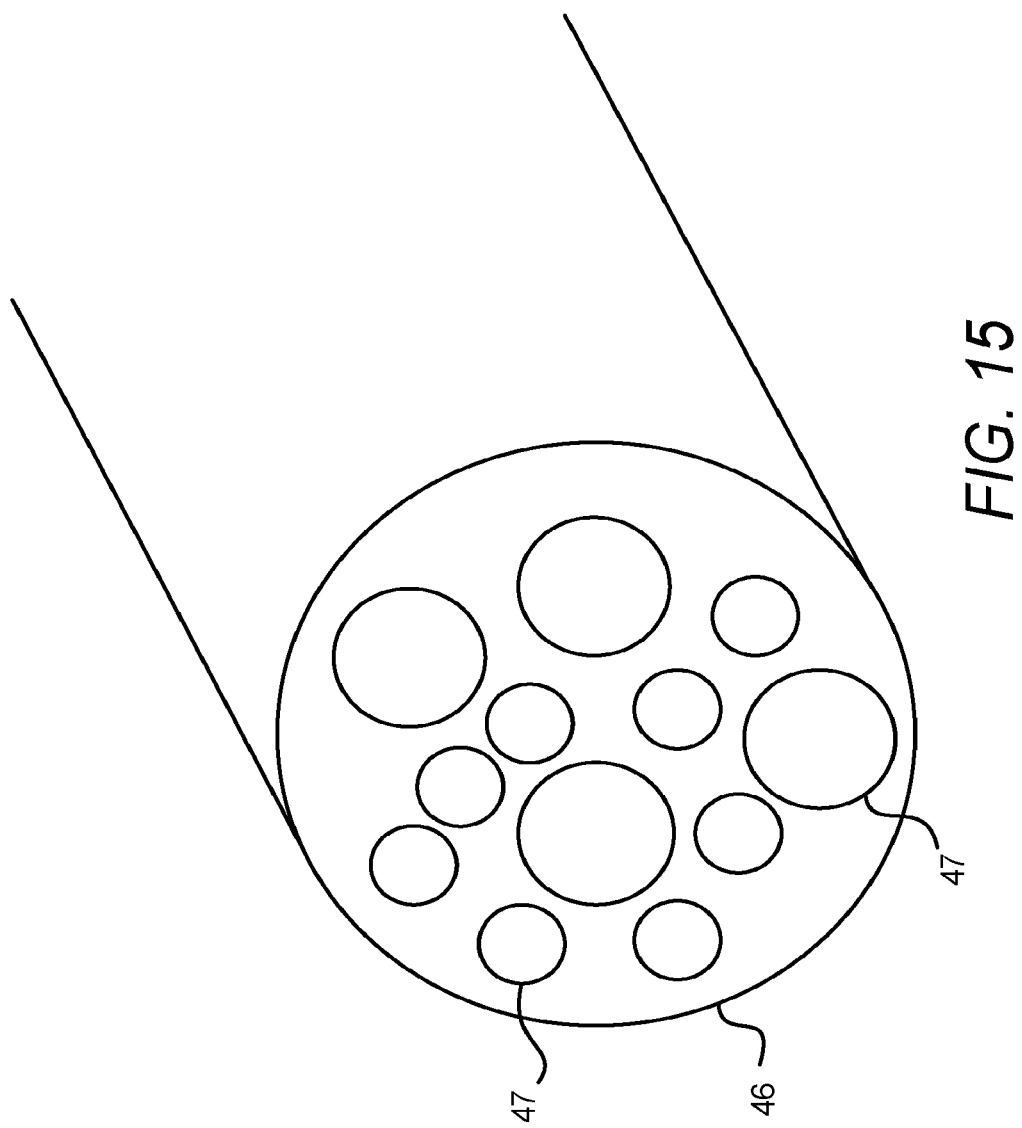
FIG. 15 shows a subsea umbilical line.

FIG. 15 shows a perspective view of a subsea umbilical line 46 according to an embodiment. The subsea umbilical line 46 powers and controls the subsea pipeline. According to an embodiment, an umbilical termination assembly is installed at each subsea drain apparatus to allow the subsea umbilical line 46 to be coupled to each drain apparatus.

The subsea umbilical line 46 includes a plurality of internal conduits 47. Internal conduits 47 typically have one out of a range of diameters from 0.25 inches to 2.5 inches. The internal conduits 47 may be selectively used for electronic cables, such as power or control cables, or for fluid or gas transfer. According to an embodiment, one internal conduit 47 is used to as a liquid removal line 44 to transfer extracted liquid to a processing facility on the land. Alternatively or additionally, another internal conduit 47 is used as a hydrate inhibitor injection line 26 to provide hydrate inhibitor from a reservoir on land to each drain apparatus.

Figure 16:
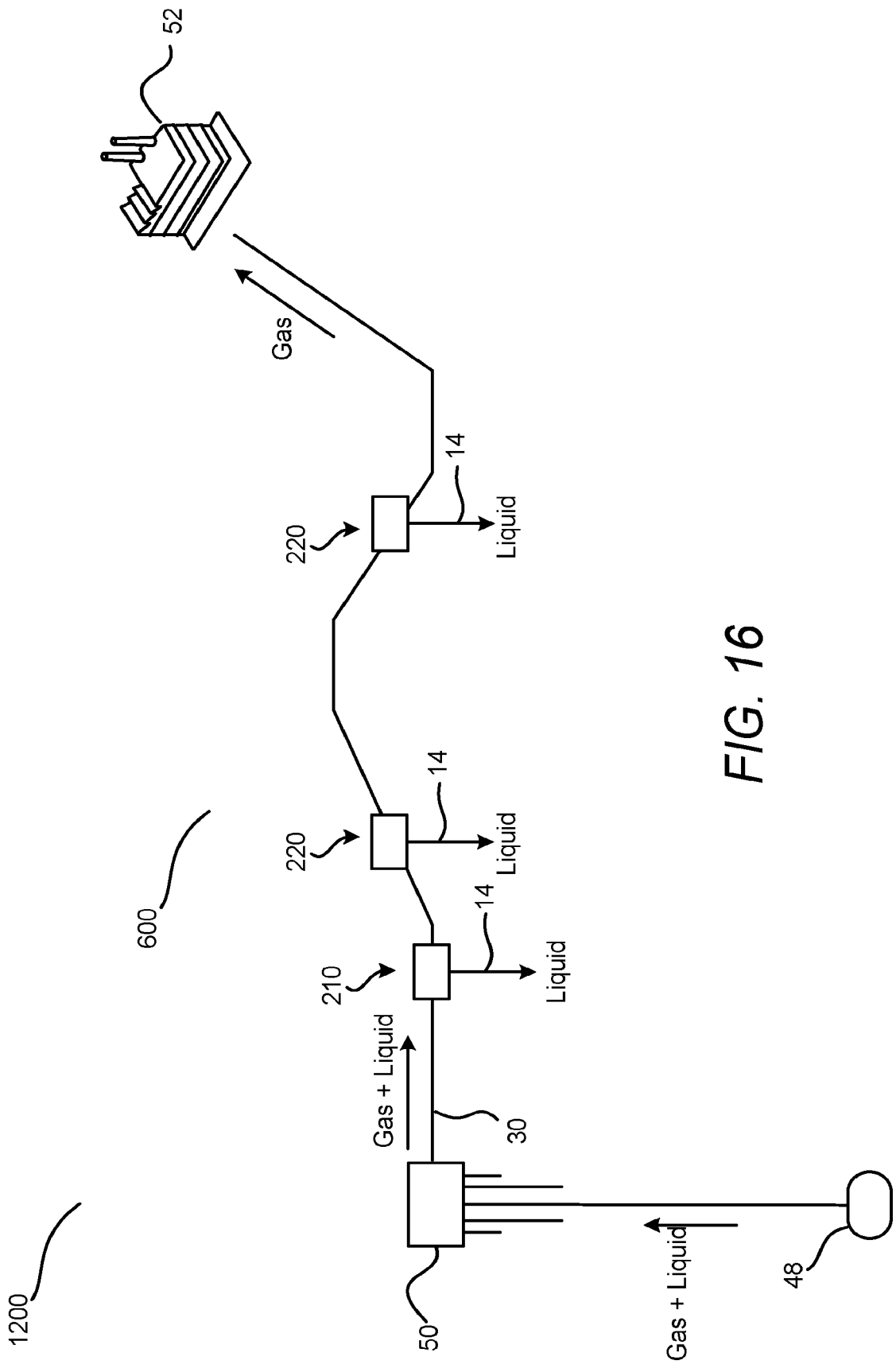
FIG. 16 shows a gathering system having a drain apparatus according to an embodiment of the present invention.

FIG. 16 shows a gathering system 1200 including a subsea pipeline 600 according to an embodiment. The gathering system 1200 includes a production gas reservoir 48. In alternative embodiments, the reservoir 48 is an oil reservoir. A well head 50 is used to draw the production gas, which is a multiphase flow, from the reservoir 48 and the reservoir pressure drives it through a pipeline 600. Although a pipeline 600 according to the embodiments described with reference to FIG. 7 is shown, any pipeline incorporating subsea drains along its length may be used to achieve the advantages described herein.

The pipeline 600 terminates at a processing facility 52 on the land or an offshore facility. The processing facility 52 receives production gas through the pipe 30, as well as liquid through the liquid removal line 44. The processing facility 52 purifies the liquid so that it can be recycled or deposited without causing environmental damage. The processing facility 52 or another land-based facility in communication with the pipeline 600 includes a pig launcher for sending pigs through the pipeline 600 to inspect, repair or clean the pipeline 600.

Two types of subsea drain apparatuses are used in the gathering system 1200—shut-down liquid drains 210 and operational liquid drains 220. A shut-down liquid drain 210 is installed at significant geographical low points. Only one shut-down liquid drain 210 is shown in FIG. 16, but this is not intended to be limiting. More than one shut-down liquid drain 210 may be installed at the same geographical low point, and/or a shut-down liquid drain 210 may be installed at each geographical low point. Therefore, liquid drop out caused by the cooling effect on shut down of the gathering system 1200 can be removed from the pipeline 600 before subsequent start up.

Figure 18:
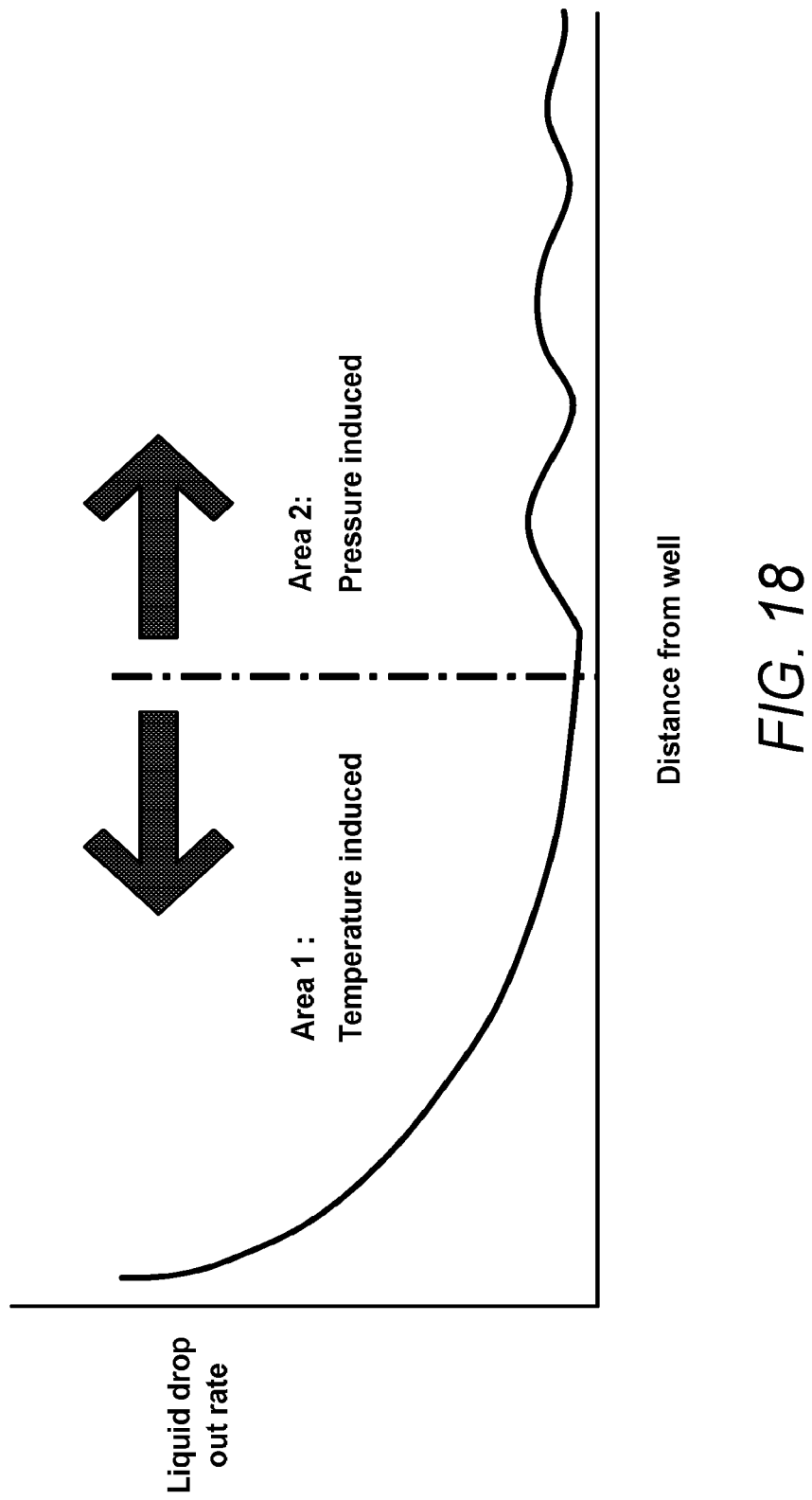
FIG. 18 is a graph showing the effect of distance from a well head on liquid drop out rate.

With reference to FIG. 18, operational liquid drains 220 are located near the reservoir 48 in order to remove the liquid drop out caused by the ambient temperature. Furthermore, operational liquid drains 220 are located on the upward or downward slopes of topographical features that induce liquid drop out in the gathering system 1200. Therefore, the position of operational liquid drains 220 is not restricted to being close to the well head, and they can be positioned at any point along the length of the subsea pipeline 600. The drain apparatuses described throughout this document are capable of operating effectively when located at substantial distances from the well head 50 while providing the described advantages. For example, in a 160 km subsea pipeline 600, a first drain apparatus can be positioned 200 m from the well head 50 to provide a continuously piggable pipeline while increasing the distance that production gas can be transported.

In an exemplary embodiment, the operational liquid drains 220 for extracting liquid due to topological effects are disposed about 15% of the way along the slope when measured from the bottom of the slope. However, to obtain the full benefit of the operational liquid drains 220, their position depends on the angle of the slope relative to the horizontal plane (i.e. the gradient or inclination of the slope), additional liquid holdup produced by the gradient as a result of temperature and pressure changes (expressed as a percentage), pressure, flow rate, and composition of the multiphase flow. Generally, as the gradient increases, the lower down the slope the operational liquid drain 220 should be disposed. The position of each drain can be determined according to the liquid holdup in relation to the gradient that causes a slugging regime. This enables each drain to be disposed at a point along the gradient at which liquid holdup in the subsea pipeline would otherwise cause slugging to occur. Additionally, the number of operational liquid drains 220 and their location can be determined according to both the design flowrate and required turn down flowrate of the gathering system. The number and location of the operational liquid drains 220 can be adapted according to different flowrates.

Figure 17:
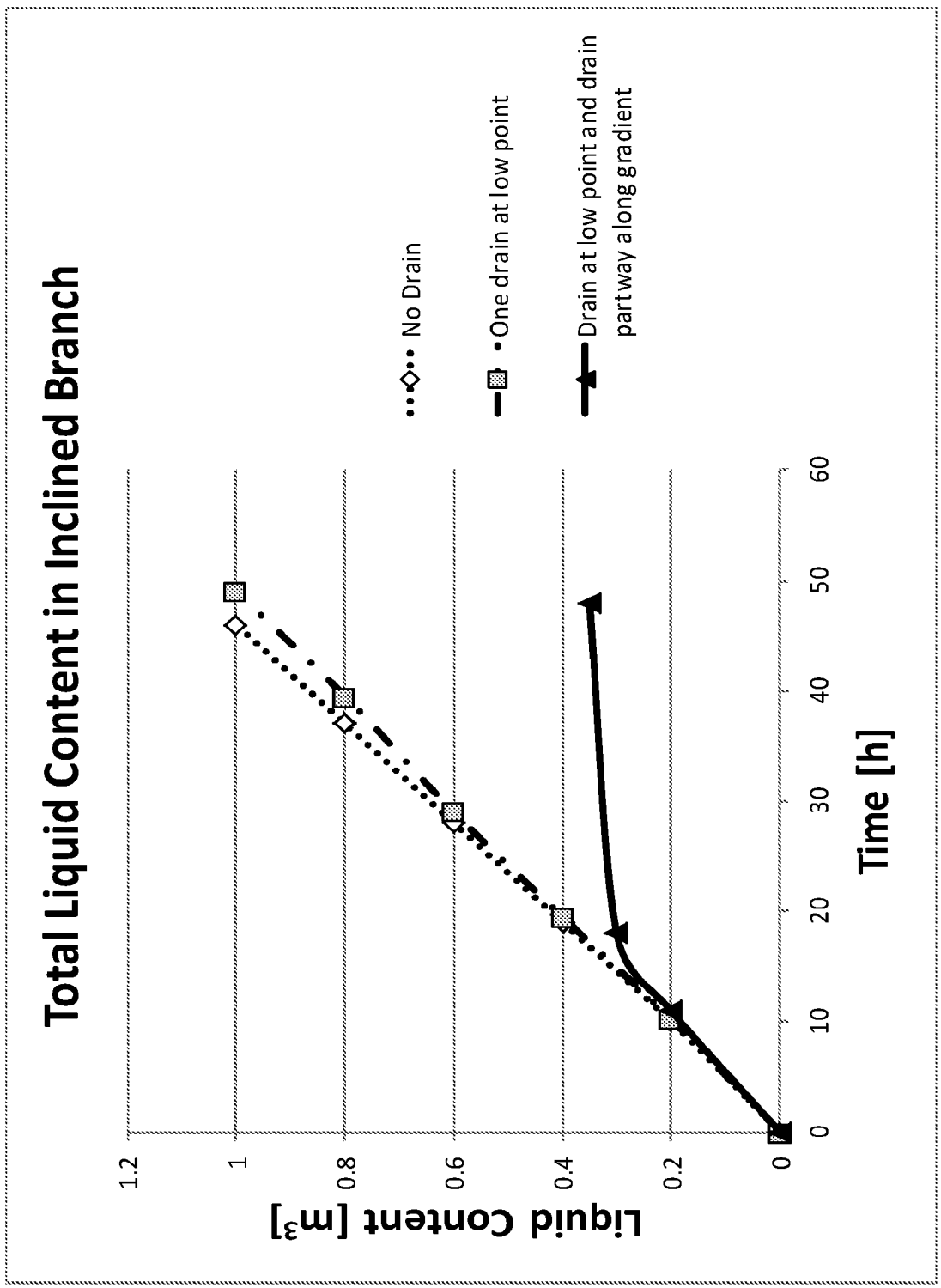
FIG. 17 is a graph showing the improved efficiency of the pipeline in FIG. 15 over prior art pipelines.

As shown by the dashed line in FIG. 17, one shut-down liquid drain 210 disposed at the bottom of a gradient has a negligible effect on the liquid content in an inclined subsea pipe 30 positioned on the gradient in relation to gradient limits on the pipeline for geotechnical and stability reasons (for example, it is not possible to lay subsea pipeline at gradients greater than about 40 degrees because it would be structurally unstable). The shut-down liquid drain 210 is primarily useful when the system 1200 is shut down and the flow ceases. Investigations by the inventors have revealed the surprising result that an operational liquid drain 220 partway along the gradient has a much larger impact on liquid content in the subsea pipe 30, as shown by the solid line in FIG. 17.

Both shut-down liquid drains 210 and operational liquid drains 220 may take any form for draining liquid from the pipeline 600. Preferably, to achieve all of the advantages described herein, the shut-down liquid drains 210 and the operational liquid drains 220 comprise the drain apparatuses described with reference to FIGS. 2a to 6 and 8 to 11b.

FIG. 20 illustrates a pig passing through a drain apparatus for removing liquid from a multiphase flow in a subsea pipeline, according to an embodiment of the present invention. The drain apparatus comprises a first channel 12 for carrying a multiphase flow comprising liquid and gas phases, and liquid extraction means 16 for extracting the liquid phase from the multiphase flow in the first channel 12, the liquid extraction means 16 comprising at least one opening 18 formed in a wall of the first channel 12 to permit liquid to be extracted through the at least one opening. The internal diameter of the first channel, d, is substantially the same as an internal diameter of a subsea pipe arranged to carry the multiphase flow in the subsea pipeline.

In the present embodiment, the distance w between the furthest downstream point of the at least one opening 18 and the furthest upstream point of the at least one opening 18 is configured to enable a pig to be driven through the first channel by a pressure differential within the first channel. To put it another way, the at least one opening 18 can be configured such that a pressure differential can be maintained across the pig 800 as the pig 800 passes through the drain apparatus. The distance w can be less than the total length of the pig 800, such that the multiphase flow cannot bypass the pig by flowing out of the first channel 12 at the furthest upstream point of the opening 18 and re-entering the first channel 12 at the furthest downstream point of the opening 18. If this were to happen, thin the pressure differential across the pig 800 would decrease. Depending on the speed at which the pig is travelling and the frictional force between the cups 801, 802 of the pig and the inner surface of the first channel 12, it could be possible for the pig to come to a halt and become stuck within the drain apparatus.

In the present embodiment the distance w between the furthest downstream point of the at least one opening 18 and the furthest upstream point of the at least one opening 18 is configured to be less than 1.5 times the internal diameter d of the first channel 12, such that a pig 800 with a length of 1.5d can be driven through the first channel by a pressure differential within the first channel 12. In some embodiments the distance w can be smaller, for example less than 0.8d to allow pigs with a minimum length of 0.8d to be driven through the first channel 12.

Figure 21:
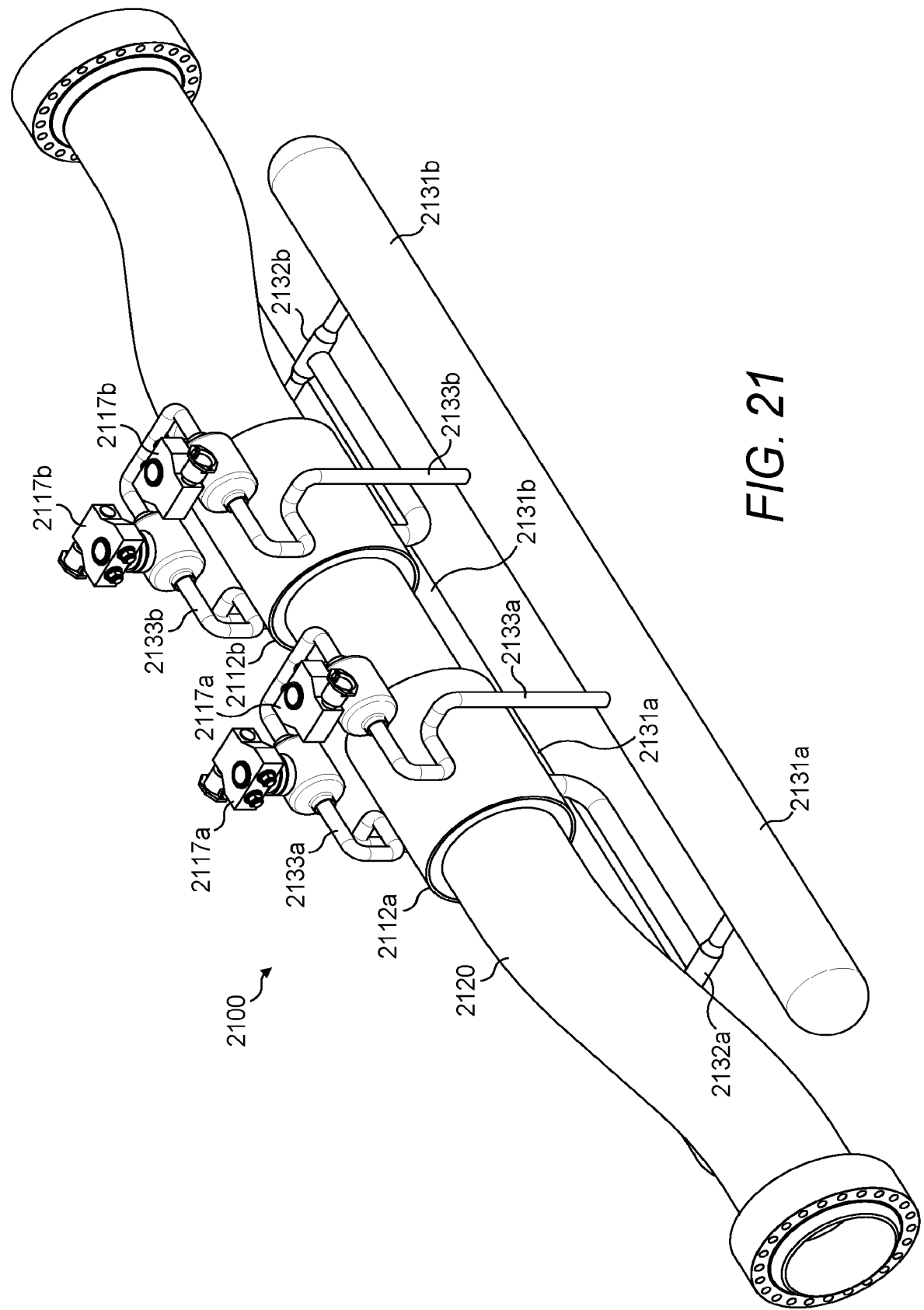
FIG. 21 illustrates a drain apparatus in perspective view, according to an embodiment of the present invention.
Figure 22:
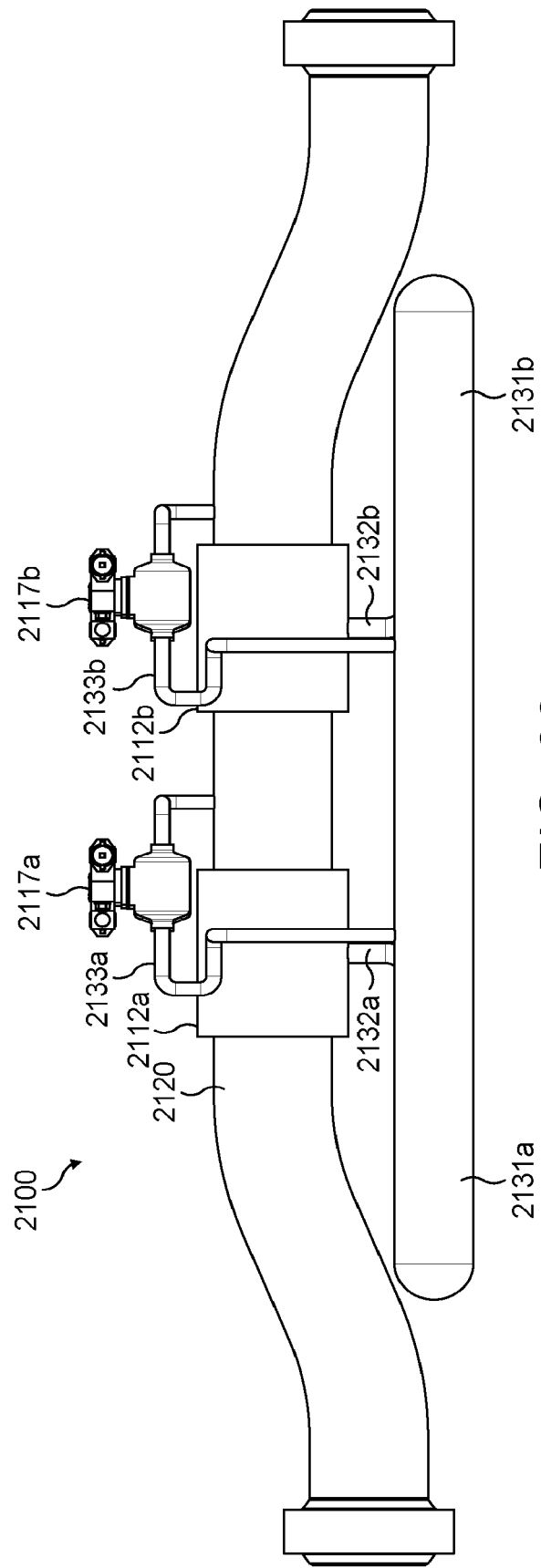
FIG. 22 illustrates a side elevation view of the drain apparatus of FIG. 21.
Figure 23:
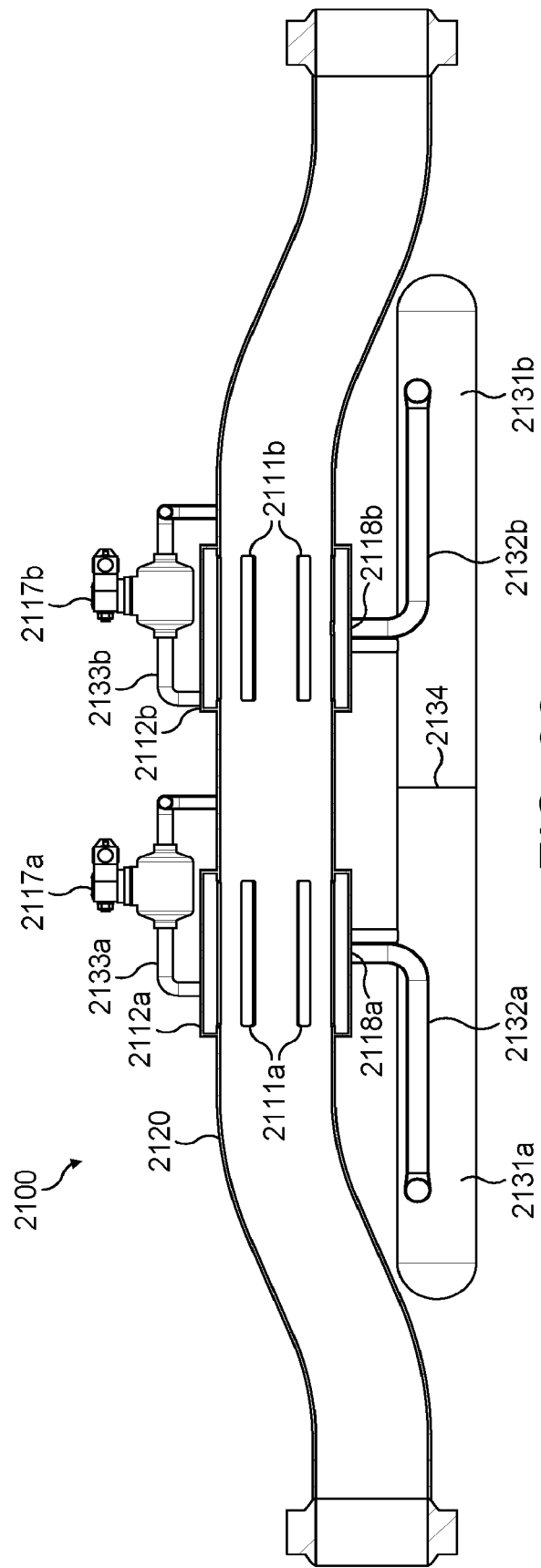
FIG. 23 illustrates a cross-sectional view of the drain apparatus of FIG. 21.

Referring now to FIGS. 21, 22 and 23, a drain apparatus is illustrated according to a further embodiment of the present invention. Like the embodiment described above with reference to FIG. 6, the drain apparatus 2100 of the present embodiment comprises liquid extraction means in the form of a first chamber 2112a and a second chamber 2112b. The first and second chambers 2112a, 2112b can each be referred to as a liquid extraction chamber. In the present embodiment the first chamber 2112a and the second chamber 2112h are spaced apart along the channel 2120, but in other embodiments the first 2112a and the second chamber 2112b could be formed from a single chamber divided by a baffle, as described above in relation to FIG. 6.

At least one first inlet 2111a is disposed in the first chamber 2112a, and at least one second inlet 2111b is disposed in the second chamber 2112b. The first inlets 2111a and second inlets 2111b are of a length less than the length of a pig, such that when a pig is travelling through the apparatus, the multiphase flow cannot bypass the pig by flowing out of the channel 2120 through the first inlet 2111a and back into the channel 2120 through the second inlet 2111b.

A first opening 2118a is formed in the wall of the first chamber 2112a at a point lower than the lowest of the first inlets 2111a. The first opening 2118a may be formed in the bottom of the first chamber 2112a. A second opening 2118b is formed in the wall of the second chamber 2112b at a point lower than the lowest of the second inlets 2111b. The second opening 2118b may be formed in the bottom of the second chamber 21112b.

In the present embodiment, unlike the one shown in FIG. 6, the first and second openings 2118a, 2118b are not fluidly coupled by a single conduit. Instead, in the present embodiment the one or more first openings 2118a are connected to one or more first storage tanks 2131a by one or more first conduits 2132a, and the one or more second openings 2118a are connected to one or more second storage tanks 2131b by one or more second conduits 2132b. The first conduits 2132a and the second conduits 2132b are disposed outside of the first chamber 2112a and the second chamber 2112b.

Raising the point at which the first conduit 2132a enters the respective first storage tank 2131a can help to stop the first conduit 2132a from being blocked by liquid contained in the first storage tank 2131a, by raising the entry point of the first conduit 2132a above the waterline. In the present embodiment each first conduit 2132a enters the respective first storage tank 2131a at a point near the top of the first storage tank 2131a.

In the present embodiment two of each of the first and second storage tanks 2131a, 2131b are provided, but in other embodiments a different number of first and second storage tanks 2131a, 2131b may be used. By increasing the number of storage tanks provided, the storage tanks can be placed alongside one another, i.e. arranged laterally, as opposed to have a single large storage tank of greater height. Accordingly, providing a plurality of storage tanks can increase the storage capacity without increasing the overall height of the structure, making installation easier. Positioning storage tanks on opposite sides of the main pipeline can also assist during installation by helping to balance the structure as the drain apparatus is lowered through the water column, having been welded to the pipeline. A further benefit of having two or more storage tanks is that the efficiency of the liquid/gas separation can be increased, by lowering the gas flow and aiding gravity-based separation.

The first and second storage tanks 2131a, 2131b act as reservoirs in which further liquid/gas separation can occur. In the present embodiment, each of the first and second storage tanks 2131a, 2131b is further connected back to the main channel 2120 by a respective first or second gas conduit 2133a, 2133h. The first and second gas conduits 2133a, 2133b fluidly connect the respective storage tank 2131a, 2131b to the main channel 2120. In the present embodiment the first and second gas conduits 2133a, 2133b exit the respective storage tank 2131a, 2131b at a point at or near the top of the storage tank, to avoid liquid entering the gas conduit 2133a, 2133b. Any gas remaining in the liquid that enters the storage tanks 2131a, 2131b will separate from the liquid over time, collecting at the top of the storage tanks 2131a, 2131b. The first and second gas conduits 2133a, 2133b allow this gas to be reintroduced to the multiphase flow in the main pipeline, thereby helping to prevent a build-up of pressure in the storage tanks 2131a, 2131b and increasing the efficiency of gas collection. One or more valves 2117a, 2117b can be disposed in the first and second gas conduit 2133a, 2133b, to control the flow of gas in the first and second gas conduits 2133a. 2133b.

Additionally, in the present embodiment the apparatus is configured so as to support the drain at a certain height above the seabed, as described above with reference to the embodiment of FIG. 8. This enables the first and second storage tanks 2131b, 2131b for collecting and storing liquid to also be situated above the seabed, thereby removing the need to excavate the seabed in order to accommodate the apparatus. In the present embodiment, curved sections of pipeline are welded between the main pipeline and the channel which passes through the liquid/gas separators, in order to accommodate the difference in height between the drain and the pipeline. The curved sections of pipeline can be configured to have a sufficiently large bend radius that the entire apparatus will be piggable once assembled.

In the embodiment shown in FIGS. 21, 22 and 23, the one or more first gas conduits 2133a may be connected to the main channel 2120 before the second chamber 2112b, so that gas from the first storage tanks 2131a is reintroduced to the main multiphase flow before it passes through the second chamber 2112b. In an alternative embodiment of the drain apparatus 2400, as shown in FIGS. 24, 24 and 26, the first and second gas conduits 2433a, 2433b are connected to the main channel 2420 after the second chamber 2412b, so that gas from the first and second storage tanks 2431a, 2431b is reintroduced to the main multiphase flow after it has passed through the first and second chambers 2412a, 2412b.

By having two liquid extraction chambers arranged in series, as in the embodiments shown in FIGS. 21 to 26, the separation efficiency across each chamber can be increased. This in turn can lower the total number of drain apparatuses that need to be installed in the pipeline, hence lowering the overall cost and complexity and increasing the operational envelope of the total liquid gathering system.

A configuration such as the one shown in FIGS. 21, 22 and 23, in which gas from the first storage tanks 2131a is reintroduced to the main multiphase flow before it passes through the second liquid extraction chamber 2112b, may be advantageous for systems in which high superficial gas velocities are expected within the one or more first storage tanks 2131a. The high gas velocities in the one or more first storage tanks 2131a may result in a percentage of liquid re-entering the main channel 2120 from the one or more first storage tanks 2131a. In these circumstances, the amount of liquid present in the main flow can then be further reduced by the second liquid extraction chamber 2112b, with the excess liquid being removed to the one or more second storage tanks 2131b.

Figure 24:
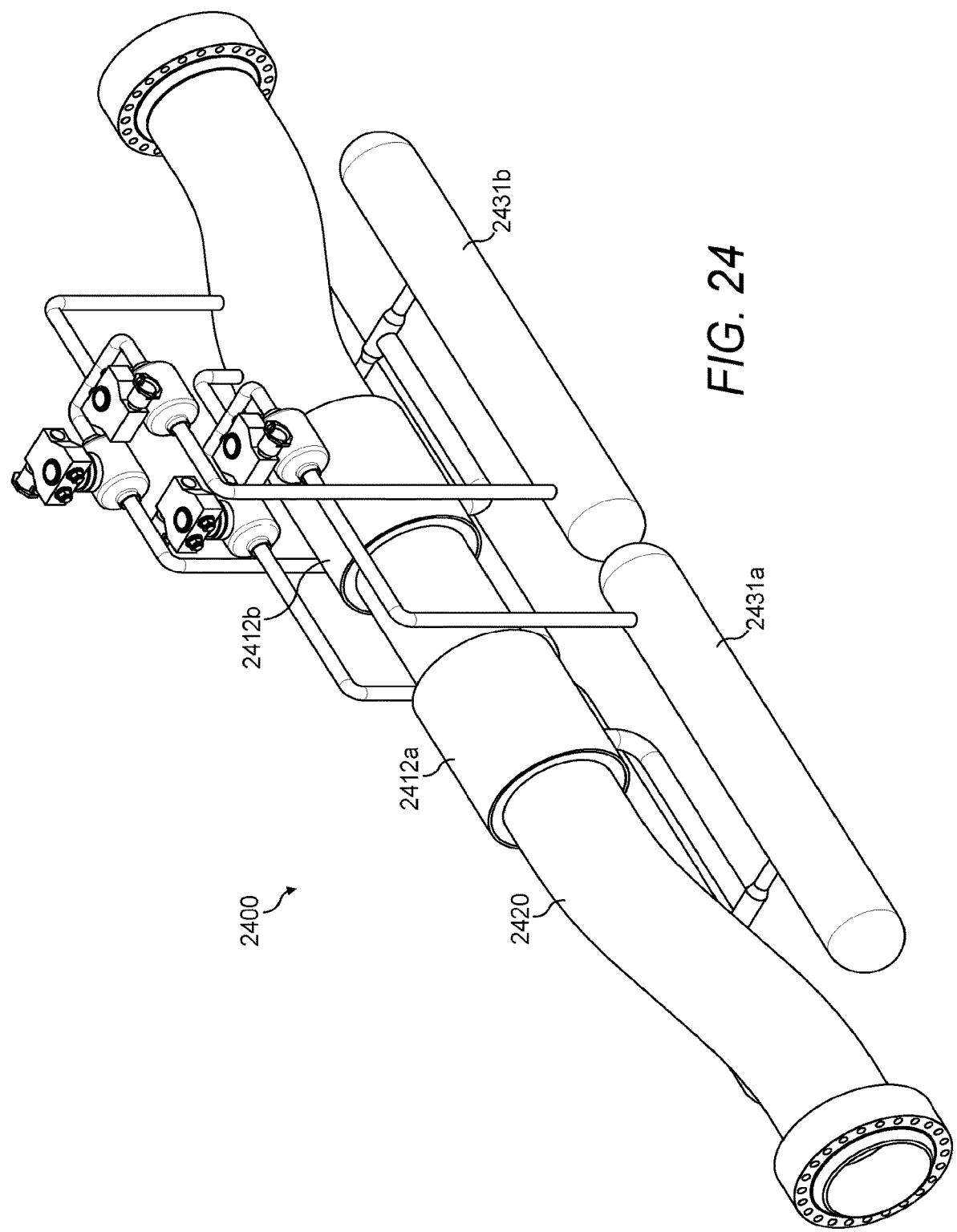
FIG. 24 illustrates a drain apparatus in perspective view, according to an embodiment of the present invention.
Figure 25:
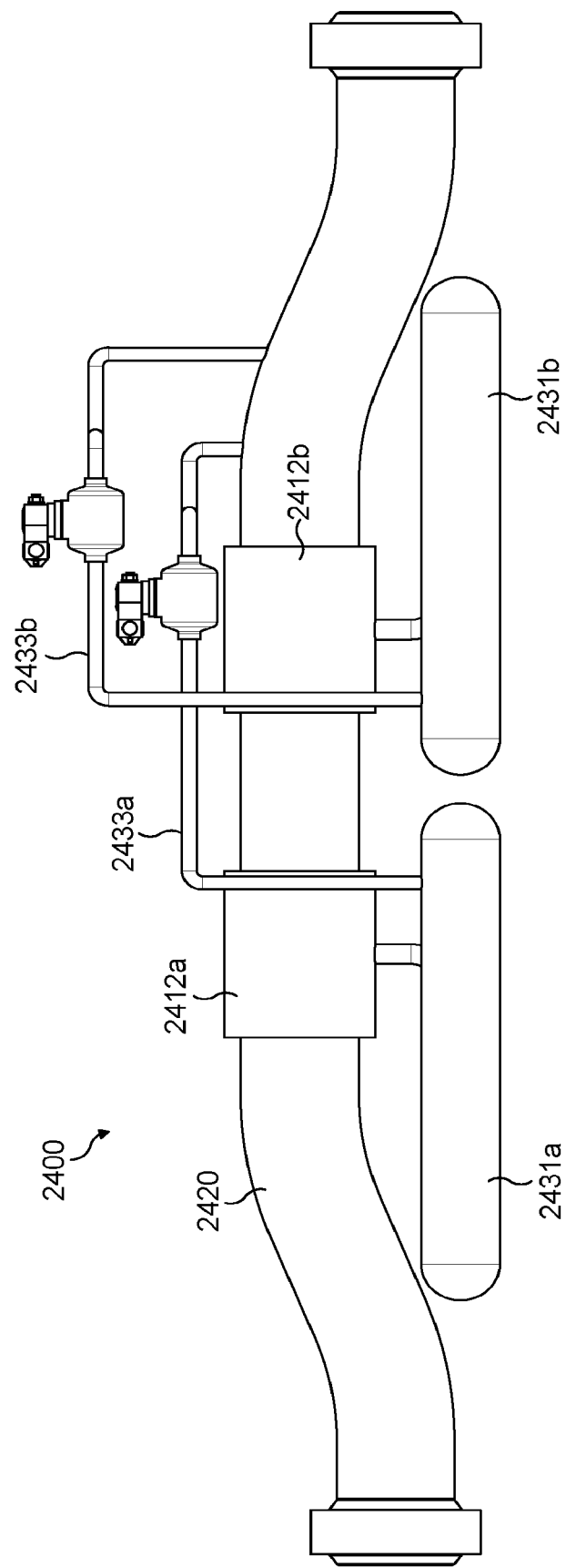
FIG. 25 illustrates a side elevation view of the drain apparatus of FIG. 24.
Figure 26:
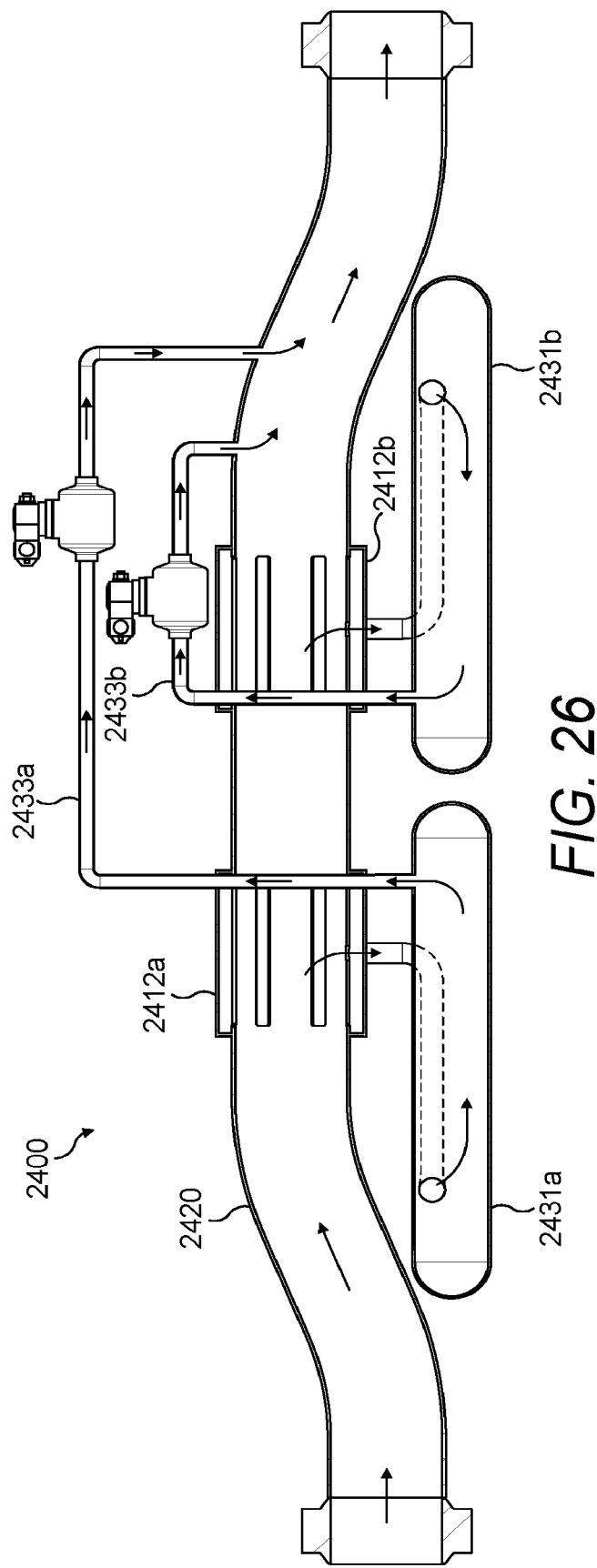
FIG. 26 illustrates a cross-sectional view of the drain apparatus of FIG. 24.

A configuration such as the one shown in FIGS. 24, 25 and 26, in which gas from the first and second storage tanks 2431a, 2431b is reintroduced to the main multiphase flow after it has passed through the first and second chambers 2412a, 2412b, may be advantageous for systems which are expected to experience higher superficial liquid velocities within an annular flow regime in the main channel 2120. Accordingly, by having gas from the one or more first storage tanks 2431a re-enter the main channel 2120 after the second liquid extraction chamber 2412b, a stable annular flow regime can be maintained in the second liquid extraction chamber 2412b. As a result, more of the total gas flow passes through the first and second storage tanks 2431a, 2431b, increasing the overall efficiency of gas/liquid separation.

Additionally, in the embodiment of FIGS. 24, 25 and 26, the first and second storage tanks 2431a, 2432b are physically separate from one another, whereas in the embodiment of FIGS. 21, 22 and 23, a first storage tank 2131a and a respective second storage tank 2131a are formed as a single body with an internal baffle 2134 dividing the body into separate first and second storage tanks 2131a, 2131b. Either arrangement is possible in any embodiment. For example, in an embodiment similar to the one shown in FIGS. 21, 22 and 23, in which gas from the one or more first storage tanks 2131a is reintroduced to the main channel 2120 before the second chamber 2112b, the first and second storage tanks 2131a, 2131b may be physically separate as shown in the embodiment of FIGS. 24, 25 and 26. Similarly, in an embodiment similar to the one shown in FIGS. 24, 25 and 26, the first and second storage tanks 2431a, 2431b may be physically connected as in the embodiment of FIGS. 21, 22 and 23.

Furthermore, in some embodiments such as the ones shown in FIGS. 21 to 26, a MEG injection port may be provided, the MEG injection port being configured to inject MEG into the main channel 2120, 2420 after the point at which the one or more second gas conduits 2132b, 2432b are connected to the main channel 2120, 2420.

Further to the advantages described above, embodiments of the present invention may further provide the following advantages:

1. Subsea tie backs can be extended to much greater distances than currently possible with prior art systems.
2. Significant improvements in the gathering system's 1200 operational envelope, such as lowering unstable flow and hydrate risks.
3. The overall system design acts as an alternative to subsea compression, by using the existing energy/pressure from the oil or gas reservoir 48 more efficiently.
4. The arrival temperature of the pipeline 600 is increased.
5. The overall back pressure within the system 1200 is lowered; this has the dual benefits of increasing the performance of the 'integrated production system' (i.e.

reservoir and pipeline gathering network), by increased production plateau flowrate and/or increased duration of plateau production.

The invention claimed is:

1. A drain apparatus for use in a subsea gas pipeline to remove liquid from a multiphase flow in the subsea gas pipeline, the drain apparatus comprising:
a first channel for carrying a multiphase flow comprising liquid and gas phases, the first channel having a first end for connection to an upstream section of the subsea gas pipeline and a second end for connection to a downstream section of the subsea gas pipeline;
liquid extraction means for extracting the liquid phase from the multiphase flow in the first channel; and
a first storage tank disposed beneath the liquid extraction means, the first storage tank being arranged to receive liquid from the liquid extraction means;
wherein the internal diameter of the first channel is substantially the same as an internal diameter of a subsea pipe arranged to carry the multiphase flow in the subsea gas pipeline, such that a pig travelling along the subsea pipe can pass through the first channel,
wherein the first channel further comprises a first curved section disposed between the first end of the first channel and the liquid extraction means, and a second curved section disposed between the second end of the first channel and the liquid extraction means, such that the first curved section is disposed before the liquid extraction means and the second curved section is disposed after the liquid extraction means,
wherein the first and second curved sections are configured such that the liquid extraction means is vertically offset from the first and second ends of the first channel to accommodate a difference in height between the liquid extraction means and the subsea gas pipeline, such that, in use, the drain apparatus is configured to support the liquid extraction means a certain height above the seabed so as to accommodate the first storage tank without a need to excavate the seabed, and
wherein a bend radius of each of said first and second curved sections is configured such that the pig travelling along the subsea pipe can pass through each of said first and second curved sections.

2. The drain apparatus of claim 1, comprising a plurality of storage tanks including the first storage tank, wherein the plurality of storage tanks are disposed beneath the liquid extraction means on opposite sides of the drain apparatus.

3. The drain apparatus of claim 1, wherein the liquid extraction means is configured so as not to permit the multiphase flow to bypass the pig as the pig passes through the first channel, such that a pressure differential can be maintained across the pig.

4. The drain apparatus of claim 3, wherein the liquid extraction means comprises at least one opening formed in a wall of the first channel to permit liquid to be extracted through the at least one opening, and
wherein a distance between the furthest downstream point of the at least one opening and the furthest upstream point of the at least one opening is less than 1.5 times the internal diameter of the first channel.

5. The apparatus of claim 3, wherein the distance between the furthest downstream point of the at least one opening and the furthest upstream point of the at least one opening is less than 0.8 times the internal diameter of the first channel.

6. The drain apparatus according to claim 1 installed in the subsea gas pipeline, wherein the drain apparatus is disposed partway along a gradient in the subsea gas pipeline to reduce liquid holdup.

7. The drain apparatus according to claim 1, wherein the liquid extraction means is a slug catcher or a separator, and/or
wherein the liquid extraction means comprises an inlet to receive liquid from the first channel, and a chamber in fluid communication with the inlet, wherein optionally the first channel passes through the longitudinal axis of the chamber, and/or wherein optionally the inlet is formed in a wall of the first channel along the longitudinal axis of the first channel, and/or
wherein the drain apparatus further comprises a second channel configured to bypass part of the first channel, the liquid extraction means being disposed on the second channel, and optionally further comprises at least one valve arranged to block the inlet in a first mode of operation and the first channel in a second mode of operation, and/or
wherein the liquid extraction means comprises an outlet in fluid communication with the chamber for removing liquid from the drain apparatus,
optionally wherein the liquid extraction means comprises the outlet, and the outlet is formed through the bottom of the chamber or is formed through an upper surface of the chamber so as to extend into the chamber.

8. The drain apparatus according to claim 7, wherein the liquid extraction means comprises the outlet and the drain apparatus further comprises:
first and second inlets formed in a wall of the first channel along the longitudinal axis of the first channel;
a baffle arranged to divide the chamber into first and second chambers, wherein the first inlet is arranged in the first chamber and the second inlet is arranged in the second chamber; and
a conduit disposed outside the chamber and connected to the first and second chambers to fluidly connect the first chamber to the second chamber,
wherein the outlet is arranged in fluid communication with the conduit,
the drain apparatus optionally further comprising:
at least one valve arranged in the conduit for controlling a flow through the conduit.

9. The drain apparatus according to claim 7, wherein the liquid extraction means comprises a reservoir in fluid communication with an opening formed in the bottom of the chamber.

10. The drain apparatus according to claim 9, wherein the opening has a diameter substantially equal to the diameter of the chamber,
optionally wherein the opening extends across the full width of the chamber, and/or wherein the reservoir comprises an overflow outlet formed through a side surface of the reservoir for transporting gas to the chamber.

11. The drain apparatus according to claim 7, wherein the outlet is in fluid communication with a third channel,
wherein the third channel is optionally an internal conduit of a subsea umbilical line or a second subsea pipe.

12. The drain apparatus according to claim 7, wherein the apparatus further comprises:
at least one pump coupled to the outlet and configured to receive liquid from the outlet and pump the liquid to the surface.

13. The drain apparatus according to claim 12, wherein the chamber or the reservoir optionally further comprises a control mechanism configured to activate the at least one pump when a liquid level in the chamber or the reservoir exceeds a threshold.

14. The drain apparatus according to claim 1, wherein the liquid extraction means comprises:
   a first liquid extraction chamber comprising at least one first inlet to receive liquid from the first channel;
   a second liquid extraction chamber comprising at least one second inlet to receive liquid from the first channel, wherein the first channel is arranged to pass through the first liquid extraction chamber before the second liquid extraction chamber; and
   a second storage tank arranged to receive liquid from the second liquid extraction chamber,
   wherein the first storage tank is arranged to receive liquid from the first liquid extraction chamber.

15. The drain apparatus according to claim 14, further comprising:
   a first gas conduit connecting the first storage tank to the first channel to permit gas flow between the first storage tank and the first channel; and/or
   a second gas conduit connecting the second storage tank to the first channel to permit gas flow between the second storage tank and the first channel.

16. The drain apparatus according to claim 15, wherein the first gas conduit and the second gas conduit are connected to the first channel after the second liquid extraction chamber.

17. The drain apparatus according to claim 15, wherein the first gas conduit is connected to the first channel before the second liquid extraction chamber, and the second gas conduit is connected to the first channel after the second liquid extraction chamber.

18. The drain apparatus according to claim 14, wherein the first channel is configured such that when the drain apparatus is installed in the subsea gas pipeline the first and second liquid extraction chambers are raised above a level of the subsea pipe at either end of the first channel, such that the first and second storage tanks can be located at or above the level of the subsea pipe and below a level at which the first and second liquid extraction chambers are located,
   optionally wherein the first channel is welded directly to the subsea pipe.

19. The drain apparatus according to claim 1, further comprising:
   at least one injection port in fluid communication with the first channel, the at least one injection port being configured to inject a hydrate inhibitor into the multiphase flow in the first channel on the dry side of the first channel such that, in use, the hydrate inhibitor is carried in the multiphase flow along the subsea gas pipeline downstream of the drain apparatus,
   optionally wherein the injection port extends through an outer surface of the first channel where the first channel protrudes from the dry side of the chamber,
   optionally wherein the injection port comprises at least one valve for controlling the rate of flow of hydrate inhibitor into the first channel,
   optionally wherein the at least one injection port is arranged to receive hydrate inhibitor from a fourth channel, the fourth channel optionally being an internal conduit of a subsea umbilical line or a third subsea pipe, and/or
   wherein the hydrate inhibitor is at least one of Ethylene glycol [MEG], Methanol or a low dose hydrate inhibition chemical.

20. The drain apparatus according to claim 1, wherein a bend radius of each of said first and second curved sections is greater than or equal to 3 times the internal diameter of the first channel.

* * * * *